(12) United States Patent
Maniwa et al.

(10) Patent No.: US 11,231,486 B2
(45) Date of Patent: Jan. 25, 2022

(54) TARGET DETECTION DEVICE AND TARGET DETECTION METHOD

(71) Applicant: MITSUBISHI ELECTRIC CORPORATION, Tokyo (JP)

(72) Inventors: Kazuaki Maniwa, Tokyo (JP); Satoshi Kageme, Tokyo (JP); Teruyuki Hara, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 94 days.

(21) Appl. No.: 16/494,206

(22) PCT Filed: Mar. 5, 2018

(86) PCT No.: PCT/JP2018/008351
§ 371 (c)(1),
(2) Date: Sep. 13, 2019

(87) PCT Pub. No.: WO2018/207444
PCT Pub. Date: Nov. 15, 2018

(65) Prior Publication Data
US 2020/0132828 A1  Apr. 30, 2020

(30) Foreign Application Priority Data

May 8, 2017 (WO) .................. PCT/JP2017/017385

(51) Int. Cl.
*G01S 7/41* (2006.01)
*G01S 13/72* (2006.01)
(Continued)

(52) U.S. Cl.
CPC ............ *G01S 7/414* (2013.01); *G01S 13/726* (2013.01); *G01S 13/222* (2013.01); *G01S 13/5246* (2013.01)

(58) Field of Classification Search
CPC .................. G01S 13/726; G01S 7/414; G01S 13/52–13/56; G01S 13/222
See application file for complete search history.

(56) References Cited

U.S. PATENT DOCUMENTS

| 5,499,030 A * | 3/1996 | Wicks ..................... G01S 7/292 342/159 |
| 5,644,315 A * | 7/1997 | Long ..................... G01S 7/2927 342/101 |
| 5,798,728 A * | 8/1998 | Tomishima ........... G01S 7/2927 342/159 |

FOREIGN PATENT DOCUMENTS

| JP | H06-249946 A | 9/1994 |
| JP | H09-281226 A | 10/1997 |

(Continued)

OTHER PUBLICATIONS

Extended European Search Report dated Feb. 10, 2020, for corresponding European Patent Application No. 18798659.1.
(Continued)

*Primary Examiner* — Matthew M Barker
(74) *Attorney, Agent, or Firm* — Birch, Stewart, Kolasch & Birch, LLP

(57) ABSTRACT

Target detection units respectively performing detection processing of targets which are different in spatial extent from each other on the basis of a detection result of amplitude or power by a detection unit are provided, and at least one determination processing unit is configured to determine presence or absence of targets from a result of the detection processing of targets by the target detection units. As a result of this configuration, it is possible to detect a target even when it has a spatial extent.

13 Claims, 18 Drawing Sheets

(51) Int. Cl.
  *G01S 13/22*    (2006.01)
  *G01S 13/524*   (2006.01)

(56) References Cited

FOREIGN PATENT DOCUMENTS

| | | |
|---|---|---|
| JP | H10-104338 A | 4/1998 |
| JP | 2000-321349 A | 11/2000 |
| JP | 3340309 B2 | 11/2002 |
| JP | 2003-028955 A | 1/2003 |
| JP | 2008-151698 A | 7/2008 |
| JP | 2017-053685 A | 3/2017 |

OTHER PUBLICATIONS

International Search Report for PCT/JP2018/008351 (PCT/ISA/210) dated Apr. 3, 2018, with English translation.

* cited by examiner

FIG. 11

|  | Determination Processing Unit 16-1 | Determination Processing Unit 16-2 | ... | Determination Processing Unit 16-M |
|---|---|---|---|---|
| Target Detection Unit 14-1 | $\alpha_1$ | $\beta_1$ | ... | $\gamma_1$ |
| Target Detection Unit 14-2 | $\alpha_2$ | $\beta_2$ | ... | $\gamma_2$ |
| Target Detection Unit 14-3 | $\alpha_3$ | $\beta_2$ | ... | $\gamma_3$ |
| ... | ... | ... | ... | ... |
| Target Detection Unit 14-N | $\alpha_N$ | $\beta_N$ | ... | $\gamma_N$ |
| Target Determination Threshold | $Th_\alpha$ | $Th_\beta$ | ... | $Th_\gamma$ |

$V(m, n)$ spans the determination processing unit columns; $Th_{td}(m)$ corresponds to the target determination threshold row.

FIG. 12

| | Detection Processing Result | | Determination Processing Unit 16-1 | Determination Processing Unit 16-2 | ... | Determination Processing Unit 6-M |
|---|---|---|---|---|---|---|
| Target Detection Unit 14-1 | Detection ○ | $D(1, r)=1$ | $D(1, r)\alpha_1 = \alpha_1$ | $D(1, r)\beta_1 = \beta_1$ | ... | $D(1, r)\gamma_1 = \gamma_1$ |
| Target Detection Unit 14-2 | Detection × | $D(2, r)=0$ | $D(2, r)\alpha_2 = 0$ | $D(2, r)\beta_2 = 0$ | ... | $D(2, r)\gamma_2 = 0$ |
| Target Detection Unit 14-3 | Detection ○ | $D(3, r)=1$ | $D(3, r)\alpha_3 = \alpha_3$ | $D(3, r)\beta_3 = \beta_3$ | ... | $D(3, r)\gamma_3 = \gamma_3$ |
| ... | ... | ... | ... | ... | ... | ... |
| Target Detection Unit 14-N | Detection ○ | $D(N, r)=1$ | $D(N, r)\alpha_N = \alpha_N$ | $D(N, r)\beta_N = \beta_N$ | ... | $D(N, r)\gamma_N = \gamma_N$ |
| $V_{sum}(m, r)$ | — | — | $\Sigma D(n, r)\alpha_n > Th_\alpha$ | $\Sigma D(n, r)\beta_n < Th_\beta$ | ... | $\Sigma D(n, r)\gamma_n < Th_\gamma$ |
| Determination Result | — | — | Determination ○ | Determination × | ... | Determination × |

$V(m, n)D(n, r)$

TARGET DETECTION DEVICE AND TARGET DETECTION METHOD

TECHNICAL FIELD

The present invention relates to a target detection device and a target detection method for detecting a target.

BACKGROUND ART

A target detection device that performs, even when clutter is included in a received signal of an electromagnetic wave reflected by a target, constant false alarm rate processing capable of detecting the target by distinguishing the clutter from the target is disclosed in the following Patent Literature 1. The constant false alarm rate processing is, for example, the Constant False Alarm Rate (CFAR) signal processing.

CITATION LIST

Patent Literatures

Patent Literature 1: JP H9-281226 A (JP 1997-281226 A)

SUMMARY OF INVENTION

TECHNICAL PROBLEM

Since the conventional target detection device is configured as described above, it is possible to detect a target whose spatial extent is small and does not exceeds resolution of a radar. However, for a target with a spatial extent that exceeds the resolution of the radar and exceeds a range of guard cells in CFAR signal processing, average power of sample cells in the CFAR signal processing may be higher than background noise power. Therefore, there is a problem that, for a target with a spacial extent that exceeds the range of the guard cells, a CFAR threshold calculated from the average power of the sample cells may be larger than signal strength of a test cell and the target cannot be detected.

The present invention has been made to solve the problem as described above, and an object of the present invention is to obtain a target detection device and a target detection method capable of detecting a target even when it has a significant spatial extent.

SOLUTION TO PROBLEM

A target detection device according to the present invention is provided with a processing circuitry: to detect, by a detector, amplitude or power of a received signal of an electromagnetic wave reflected by a target; to perform, by a plurality of target detectors, respectively, detection processing of targets which are different in spatial extent from each other on a basis of a detection result of the amplitude or power by the detector; and to determine, by at least one determination processing unit, presence or absence of a target from a result of the detection processing of targets obtained by the plurality of target detectors. Weight values each corresponding to a spatial extent of a detectable target is set for the plurality of target detectors, respectively. The at least one determination processor determines presence or absence of a target by calculating, for the plurality of target detectors, multiplication values of the weight values set for the plurality of target detectors and detection values each indicating the result of the detection processing of a target by each of the plurality of target detectors, respectively, and by comparing a sum of the multiplication values of the weight values and the detection values of the plurality of target detectors and a target determination threshold.

ADVANTAGEOUS EFFECTS OF INVENTION

According to the present invention, the target detection device is provided with a plurality of target detection units respectively performing detection processing of targets which are different in spatial extent from each other on a basis of a detection result of the amplitude or power by the detection unit. At least one determination processing unit determines presence or absence of a target from a result of the detection processing of targets obtained by the plurality of target detection units. As a result, the target detection device according to the present invention can also detect a target having a significant spatial extent.

BRIEF DESCRIPTION OF DRAWINGS

FIG. 11 is an explanatory diagram showing parameters for setting target detection performance stored in a parameter storage unit 15.

FIG. 12 is an explanatory diagram showing relationship between the target detection processing results by the target detection units 14-$n$ and determination results of determination processing units 16-$m$.

FIG. 17 is a flowchart showing a target detection method which is a processing procedure when the target detection device 6B is implemented by software, firmware, or the like.

DESCRIPTION OF EMBODIMENTS

Hereinafter, in order to explain the present invention in more detail, some embodiments for carrying out the present invention will be described with reference to the accompanying drawings.

First Embodiment

Figure 1:
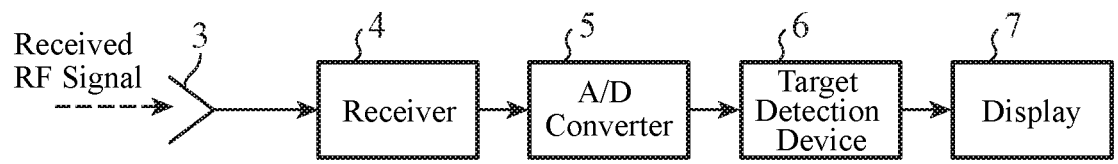
FIG. 1 is a configuration diagram showing a radar apparatus including a target detection device 6 according to a first embodiment of the present invention.

FIG. 1 is a configuration diagram showing a radar apparatus including a target detection device 6 according to a first embodiment of the present invention.

Figure 2:
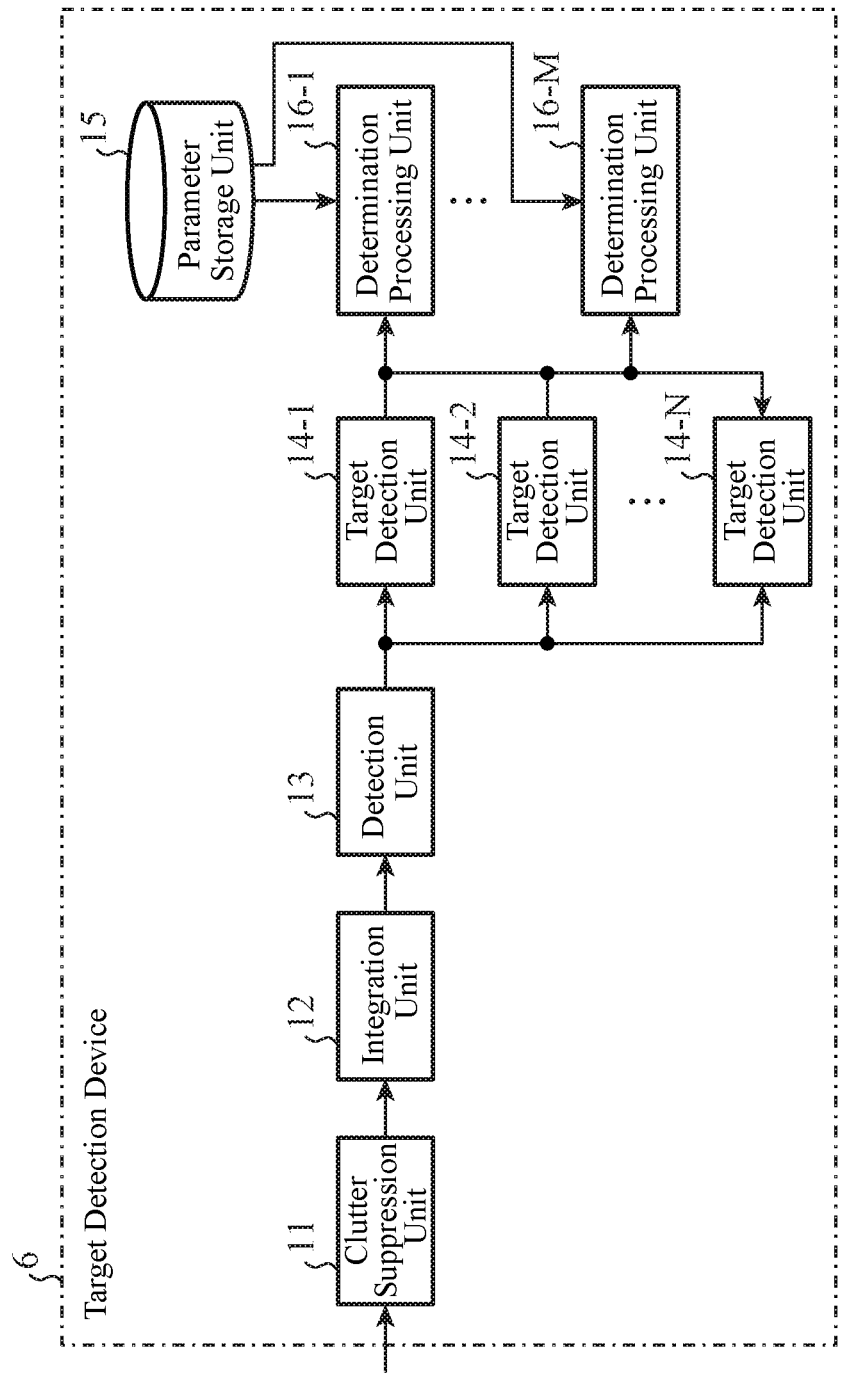
FIG. 2 is a configuration diagram showing the target detection device 6 according to the first embodiment of the present invention.
Figure 3:
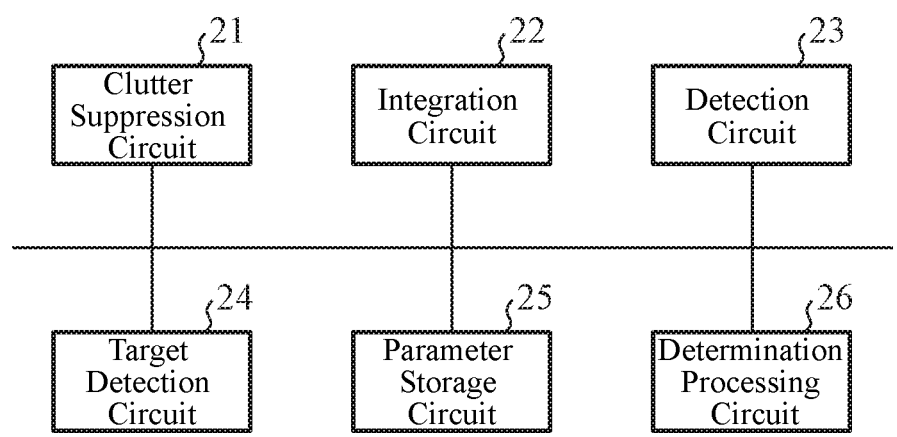
FIG. 3 is a hardware configuration diagram showing the target detection device 6 according to the first embodiment of the present invention.

FIG. 2 is a configuration diagram showing the target detection device 6 according to the first embodiment of the present invention. FIG. 3 is a hardware configuration diagram showing the target detection device 6 according to the first embodiment of the present invention.

As shown in FIGS. 1 to 3, a transmitter 1 generates a transmission RF signal which is an electromagnetic wave, and outputs the transmission RF signal to a transmitting antenna 2.

The transmitting antenna 2 radiates the transmission RF signal output from the transmitter 1 into space.

After being radiated from the transmitting antenna 2, a receiving antenna 3 receives the transmission RF signal, which is radiated from the transmitting antenna 2 and reflected by a target as a received RF signal, and outputs the received RF signal to a receiver 4.

The receiver 4 performs receiving processing on the received RF signal output from the receiving antenna 3, and outputs a received signal which is the signal after the receiving processing to an A/D converter 5.

The receiver 4 performs, as the receiving processing, for example, frequency modulation processing, band limitation processing, and amplification processing, on the received RF signal.

The A/D converter 5 is an analog-to-digital converter, converts the received signal output from the receiver 4 from an analog signal to a digital signal, and outputs a digitalized received signal to the target detection device 6.

The target detection device 6 detects a target on the basis of the digital received signal output from the A/D converter 5.

A display 7 displays a spatial extent and the like of the target detected by the target detection device 6.

A clutter suppression unit 11 of the target detection device 6 is implemented by, for example, a clutter suppression circuit 21 illustrated in FIG. 3.

The clutter suppression unit 11 suppresses clutter included in the digital received signal output from the A/D converter 5, and performs processing of outputting a clutter-suppressed received signal to an integration unit 12.

The integration unit 12 of the target detection device 6 is implemented by, for example, an integration circuit 22 shown in FIG. 3.

The integration unit 12 integrates the clutter-suppressed received signal output from the clutter suppression unit 11, and performs processing of outputting an integrated received signal to a detection unit 13.

The detection unit 13 of the target detection device 6 is implemented by, for example, a detection circuit 23 shown in FIG. 3.

The detection unit 13 detects amplitude or power of the integrated received signal output from the integration unit 12, and performs processing of outputting a received video signal to each of target detection units 14-1 to 14-N as a detection result of the amplitude or power.

A target detection unit 14-$n$ ($n=1, 2, \ldots, N$) of the target detection device 6 is implemented by, for example, a target detection circuit 24 shown in FIG. 3.

The target detection unit 14-$n$ performs detection processing of targets having different spatial extents on the basis of the received video signal output from the detection unit 13.

A parameter storage unit 15 is implemented by, for example, a parameter storage circuit 25 shown in FIG. 3.

The parameter storage unit 15 stores parameters for setting target detection performance.

In the parameter storage unit 15, as the parameters for setting the target detection performance, a target determination threshold for each determination processing unit 16-$m$ ($m=1, 2, \ldots, M$) and a weight value for each target detection unit 14-$n$ are stored.

The weight value for each target detection unit 14-$n$ is a weight value corresponding to a spatial extent of a target that can be detected, and is stored for each determination processing unit 16-$m$.

The determination processing unit 16-$m$ is implemented by, for example, a determination processing circuit 26 illustrated in FIG. 3.

In the determination processing unit 16-$m$, the target determination threshold for each determination processing unit 16-$m$ and the weight value for each target detection unit 14-$n$ for each determination processing unit 16-$m$ which are stored in the parameter storage unit 15 are set.

The determination processing unit 16-$m$ performs, for each target detection unit 14-$n$, processing of calculating a multiplication value of the weight value set in the target detection unit 14-$n$ and a detection value indicating a target detection processing result obtained by the target detection unit 14-$n$.

Further, the determination processing unit 16-$m$ performs processing of determining presence or absence of a target by comparing a total sum of the multiplication values of the weight values and the detection values for the target detection units 14-1 to 14-N and the target determination threshold set in the determination processing unit 16-$m$.

In FIG. 2, it is assumed that each of the clutter suppression unit 11, the integration unit 12, the detection unit 13, the target detection unit 14-$n$, the parameter storage unit 15, and the determination processing unit 16-$m$ which are components of the target detection device 6 is implemented by dedicated hardware as shown in FIG. 3. Namely, it is assumed that they are implemented by the clutter suppression circuit 21, the integration circuit 22, the detection circuit 23, the target detection circuit 24, the parameter storage circuit 25, and the determination processing circuit 26.

Here, the parameter storage circuit 25 corresponds to a nonvolatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, an optical disk, a compact disk, a mini disk, a digital versatile disc (DVD), or the like.

Further, the clutter suppression circuit 21, the integration circuit 22, the detection circuit 23, the target detection circuit 24, and the determination processing circuit 26 each correspond to, for example, a single circuit, a composite circuit, a programmed processor, a parallel programmed processor, an application specific integrated circuit (ASIC), a field-programmable gate array (FPGA), or a combination thereof.

The components of the target detection device 6 are not limited to those implemented by the dedicated hardware, and the target detection device 6 may be implemented by software, firmware, or a combination of software and firmware.

The software or firmware is stored as a program in a memory of a computer. The computer means hardware that executes a program, and corresponds to, for example, a central processing unit (CPU), a central processing device, a processing unit, an arithmetic unit, a microprocessor, a microcomputer, a processor, and a digital signal processor (DSP).

Figure 4:
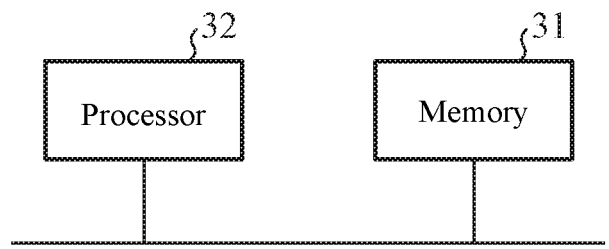
FIG. 4 is a hardware configuration diagram of a computer in a case where the target detection device 6 is implemented by software or firmware.

FIG. 4 is a hardware configuration diagram of a computer when the target detection device 6 is implemented by software or firmware.

In a case where the target detection device 6 is implemented by software or firmware, the parameter storage unit 15 is formed on a memory 31 of the computer. Further, a program for causing the computer to execute a processing procedure of each of the clutter suppression unit 11, the integration unit 12, the detection unit 13, the target detection unit 14-$n$, and the determination processing unit 16-$m$ is stored in the memory 31. Then, a processor 32 of the computer executes the program stored in the memory 31.

Figure 5:
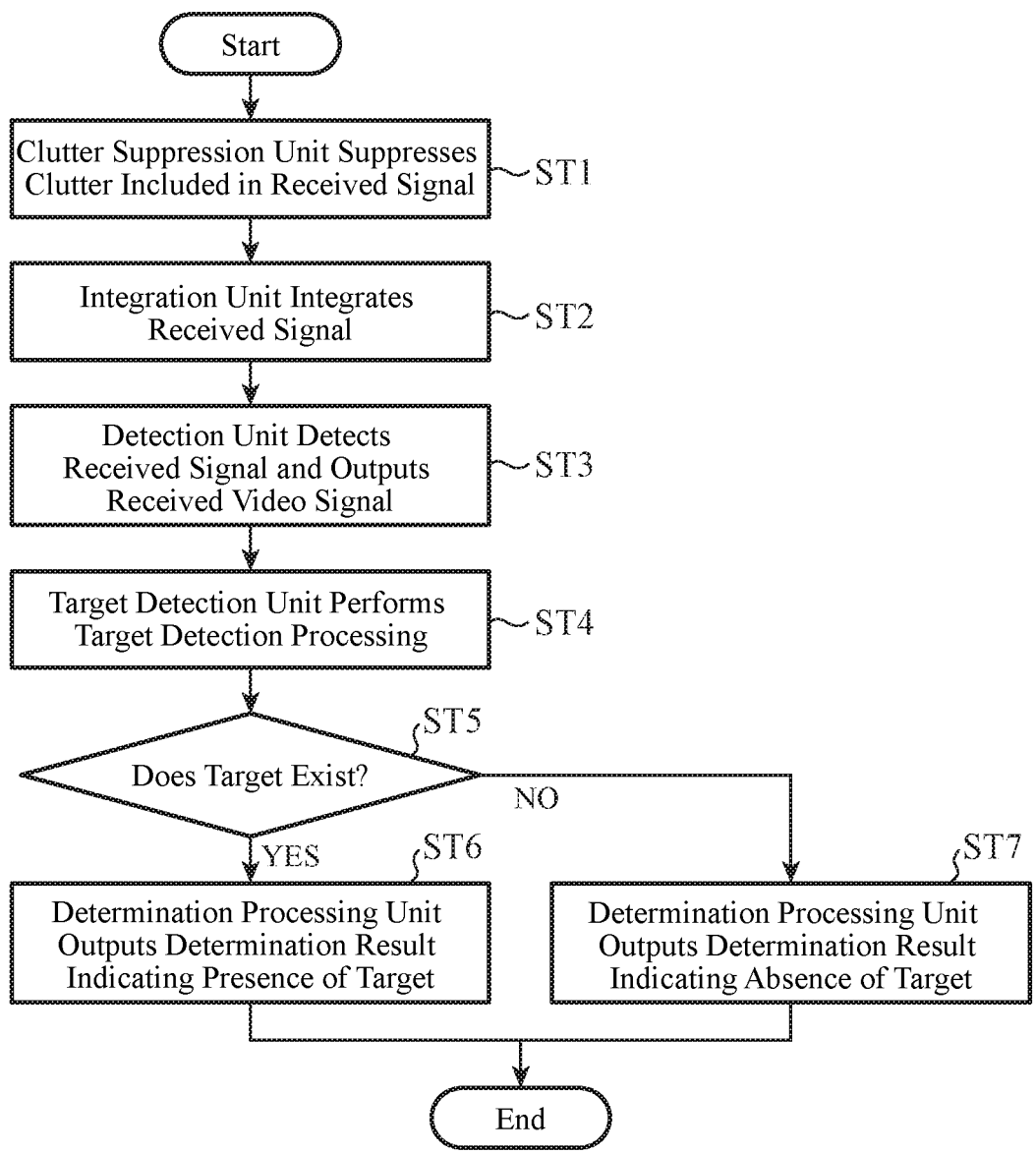
FIG. 5 is a flowchart showing a target detection method which is a processing procedure in a case where the target detection device 6 is implemented by the software or firmware.

FIG. 5 is a flowchart showing a target detection method which is a processing procedure in a case where the target detection device 6 is implemented by software or firmware.

Further, FIG. 3 shows an example in which each of the components of the target detection device 6 is implemented by dedicated hardware, and FIG. 4 shows an example in which the target detection device 6 is implemented by software or firmware. However, the target detection device 6 may be configured such that some components are implemented by dedicated hardware and remaining components are implemented by software or firmware.

Before describing operation of the radar apparatus including the target detection device 6, CFAR signal processing, which is constant false alarm rate processing, will be described.

Figure 6:
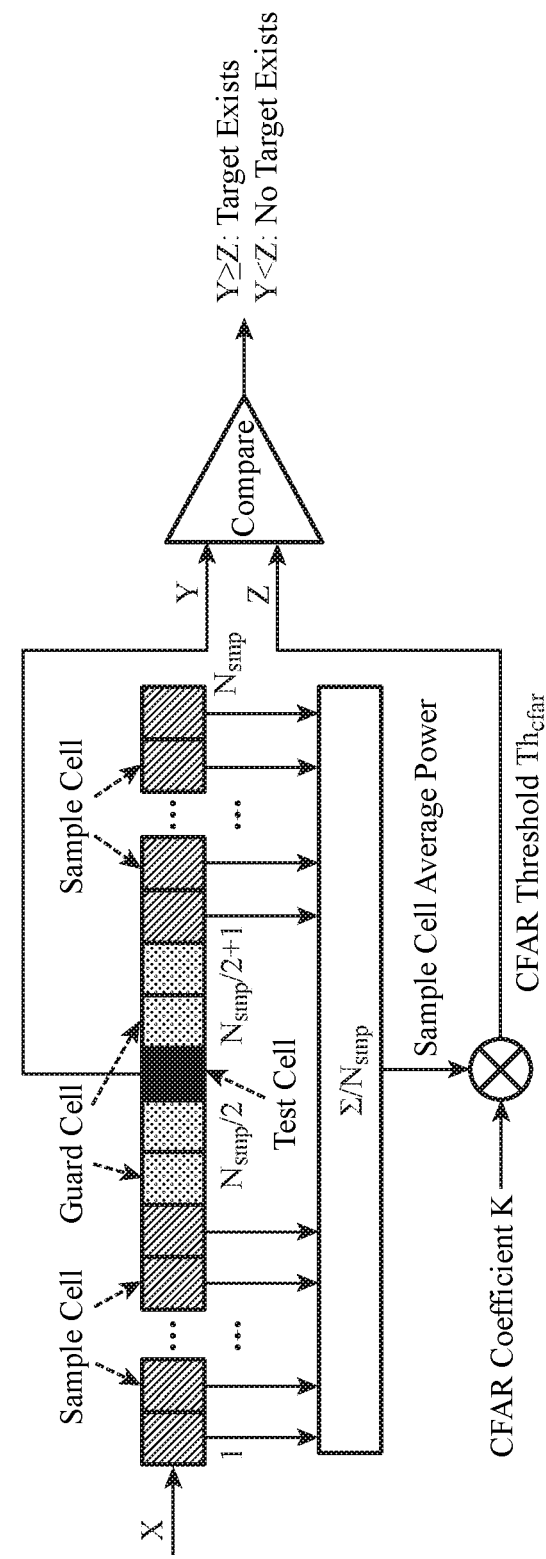
FIG. 6 is an explanatory diagram showing an outline of CFAR signal processing.

FIG. 6 is an explanatory diagram showing an outline of the CFAR signal processing.

The received video signal output from the detection unit 13 is input data of the CFAR signal processing, and moves in a plurality of cells in the CFAR signal processing in a rightward direction in the drawing.

In other words, in the drawing, the received video signal moves from sample cells on a left side to guard cells and reaches a test cell. After that, in the drawing, it moves to guard cells on a right side and moves to sample cells on the right side.

In the CFAR signal processing, power X, which is signal strength of the received video signal, is set in all the cells in the CFAR signal processing.

Next, in the CFAR signal processing, a CFAR threshold $Th_{cfar}$ is calculated by multiplying sample cell average power, which is an average value of power in the plurality of sample cells existing before and after the test cell serving as a target cell of determining presence or absence, and a CFAR coefficient.

Next, in the CFAR signal processing, power Y of the test cell is compared with the CFAR threshold $Th_{cfar}(=Z)$. In the CFAR signal processing, when the power Y of the test cell is equal to or greater than the CFAR threshold $Th_{cfar}$, it is determined that there is a target, and when the power Y of the test cell is less than the CFAR threshold $Th_{cfar}$, it is determined that there is no target.

Although the power of the received video signal is treated as the signal strength of the received video signal in FIG. 6, amplitude of the received video signal may be treated as the signal strength of the received video signal.

Figure 7:
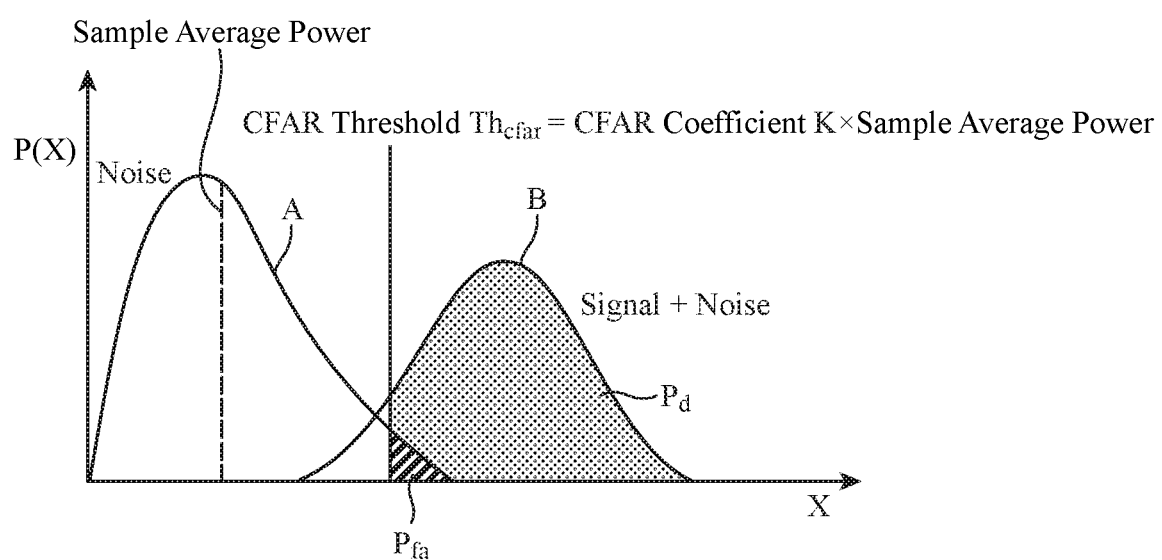
FIG. 7 is an explanatory diagram showing a principle of the CFAR signal processing.

FIG. 7 is an explanatory diagram showing a principle of the CFAR signal processing.

In FIG. 7, the horizontal axis indicates amplitude X of the received video signal, and the vertical axis indicates probability density P(X) which is a ratio of a frequency of occurrence of the amplitude X of the received video signal to the whole.

Although the amplitude of the received video signal is treated as the signal strength of the received video signal in FIG. 7, the power of the received video signal may be treated as the signal strength of the received video signal.

A distribution of only noise, which is clutter, is indicated by A, and a distribution of a sum of a target signal and the noise is indicated by B.

In the distribution B, the portion where the amplitude X of the received video signal exceeds the CFAR threshold $Th_{cfar}$ represents a probability of being detected as a target, and this probability is generally called a detection probability Pd.

In the distribution A, the portion where the amplitude X of the received video signal exceeds the CFAR threshold $Th_{cfar}$ represents a probability that noise is detected as a false alarm, and this probability is generally called a false alarm probability $Pf_a$.

It is known that the noise distribution A follows the Rayleigh distribution, and the noise distribution A is expressed as the following equation (1).

$$p(x) = \frac{2x}{\sigma^2}\exp\left(-\frac{x^2}{\sigma^2}\right) \tag{1}$$

In equation (1), x is amplitude of the received video signal, $\sigma$ is dispersion of the amplitude x of the received video signal, and p(x) is probability density of the amplitude x of the received video signal.

The false alarm probability $Pf_a$ is expressed by the following equation (2) when the CFAR threshold $Th_{cfar}$ is set to a constant multiple of an amplitude average of noise.

$$P_{fa} = \int_{Th_{cfar}}^{\infty} p(x)dx = \exp\left(-\frac{\pi}{4}k^2\right) \quad (2)$$

$$Th_{cfar} = K \cdot \langle x \rangle \quad (3)$$

In equations (2) and (3), k is a coefficient, K is a CFAR coefficient, and <x> is an average amplitude of noise.

Figure 8A:
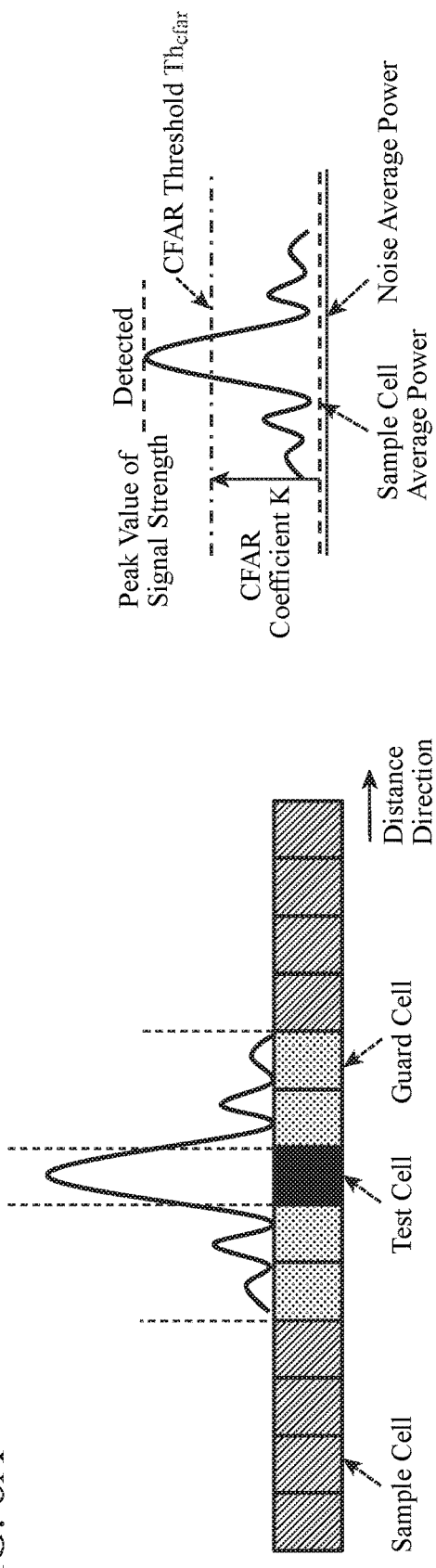
FIG. 8A is an explanatory diagram showing a relationship between a target with high peak signal strength and the CFAR signal processing.
Figure 8B:
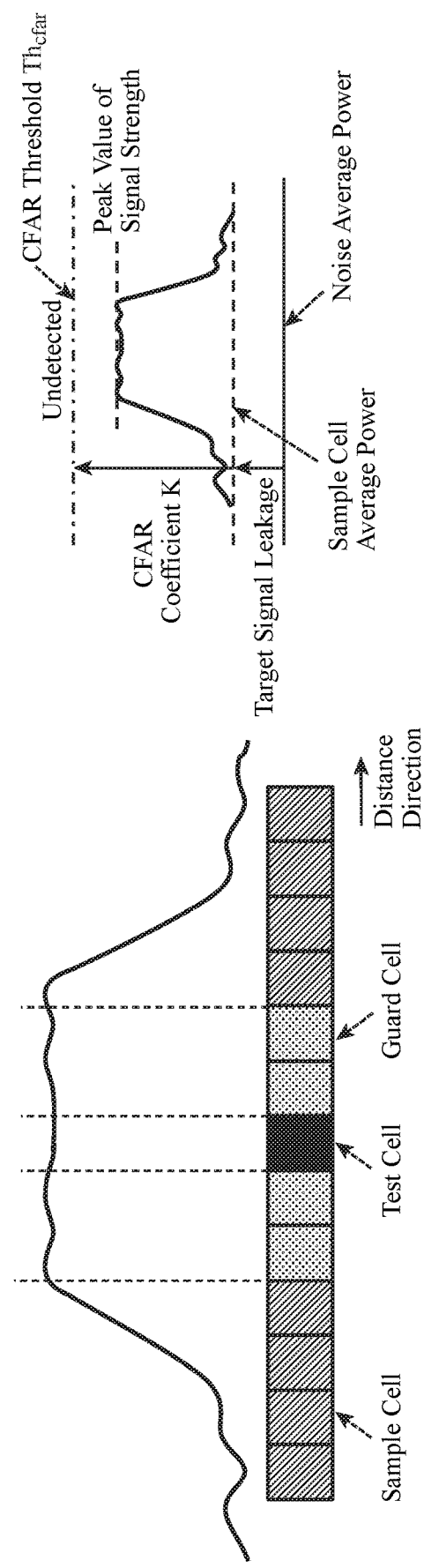
FIG. 8B is an explanatory diagram showing a relationship between a target with a large spatial extent and the CFAR signal processing.

FIGS. 8A and 8B are explanatory diagrams each showing a relationship between a spatial extent of a target and the CFAR signal processing.

FIG. 8A is an explanatory diagram showing a relationship between a target with high peak signal strength and the CFAR signal processing.

The target with the high peak signal strength is a target with a small spatial extent and, for example, a case where only one target is present alone can be considered.

FIG. 8B is an explanatory diagram showing a relationship between a target having a large spatial extent and the CFAR signal processing.

The target having a large spatial extent may be, for example, a target group in which a plurality of targets exists within a certain range.

FIGS. 8A and 8B each show an example in which a plurality of cells in the CFAR signal processing is aligned in a range direction (distance direction).

In FIGS. 8A and 8B, the signal strength means power.

As shown in FIG. 8A, in the target with the high peak signal strength, most of target signals contained in the received video signal are in a test cell, and the target signal hardly leaks into sample cells.

Therefore, average power of the sample cells is almost equal to ambient noise average power, and as shown in FIG. 8A, a CFAR threshold $Th_{cfar}$ calculated from the average power of the sample cells is a value between a peak value of the signal strength and the noise average power. The ambient noise average power corresponds to background noise power.

Therefore, because the signal strength of the test cell is equal to or higher than the CFAR threshold $Th_{cfar}$, the target can be detected.

As shown in FIG. 8B, in the target having a large spatial extent, target signals contained in the received video signal leaks into the sample cells, and average power of the sample cells is higher than ambient noise average power.

Therefore, there is a case that a CFAR threshold $Th_{cfar}$ calculated from the average power of the sample cells is larger than a peak value of the signal strength, as shown in FIG. 8B.

Therefore, the signal strength of a test cell falls below the CFAR threshold $Th_{cfar}$, and in such a case, the target may not be detected.

In CFAR signal processing disclosed in the above-mentioned Patent Literature 1, it is possible to detect a target with high peak signal strength as shown in FIG. 8A, but it is not possible to detect a target with a large spatial extent as shown in FIG. 8B.

Next, details of an operation of the radar apparatus including the target detection device 6 will be described.

The transmitter 1 generates a transmission RF signal which is an electromagnetic wave, and outputs the transmission RF signal to the transmitting antenna 2.

The transmitting antenna 2 radiates the transmission RF signal output from the transmitter 1 into space.

The receiving antenna 3 receives the transmission RF signal radiated from the transmitting antenna 2 and then reflected by a target as a received RF signal, and outputs the received RF signal to the receiver 4.

The receiver 4 performs receiving processing on the received RF signal output from the receiving antenna 3, and outputs a received signal which is a signal after the receiving processing to the A/D converter 5.

The A/D converter 5 converts the received signal output from the receiver 4 from an analog signal to a digital signal, and outputs the digitalized received signal to the target detection device 6.

The clutter suppression unit 11 of the target detection device 6 suppresses clutter included in the digital received signal output from the A/D converter 5, and outputs a clutter-suppressed received signal to the integration unit 12 (step ST1 in FIG. 5).

Thereby, clutter caused by topography of a place where the radar apparatus is installed, clutter caused by a weather condition, and the like are suppressed. Clutter reflected by the ground, mountains or the sea corresponds to the clutter caused by the topography, and clutter reflected by rain or cloud corresponds to the clutter caused by the weather condition.

As a clutter suppression method by the clutter suppression unit 11, a method such as moving target indication (MTI) or adaptive moving target indication (AMTI) can be used.

The integration unit 12 integrates the clutter-suppressed received signal output from the clutter suppression unit 11, and outputs the integrated received signal to the detection unit 13 (step ST2 in FIG. 5).

As a result, a signal-to-noise ratio of the received signal can be improved.

The detection unit 13 detects power of the integrated received signal output from the integration unit 12, and outputs a received video signal which is a detection result of the power to each of the target detection units 14-1 to 14-N (step ST3 in FIG. 5).

In the first embodiment, an example in which the detection unit 13 detects the power of the received signal is described, but the detection unit 13 may detect amplitude of the received signal.

Upon reception of the received video signal from the detection unit 13, the target detection unit 14-$n$ (n=1, 2, . . . , N) detects a target by performing CFAR signal processing based on the received video signal as target detection processing (step ST4 in FIG. 5).

The CFAR signal processing performed by the target detection units 14-1 to 14-N is different in CFAR condition from each other, and spatial extents of targets which can be detected by the target detection units 14-1 to 14-N are different from each other.

Figure 9A:
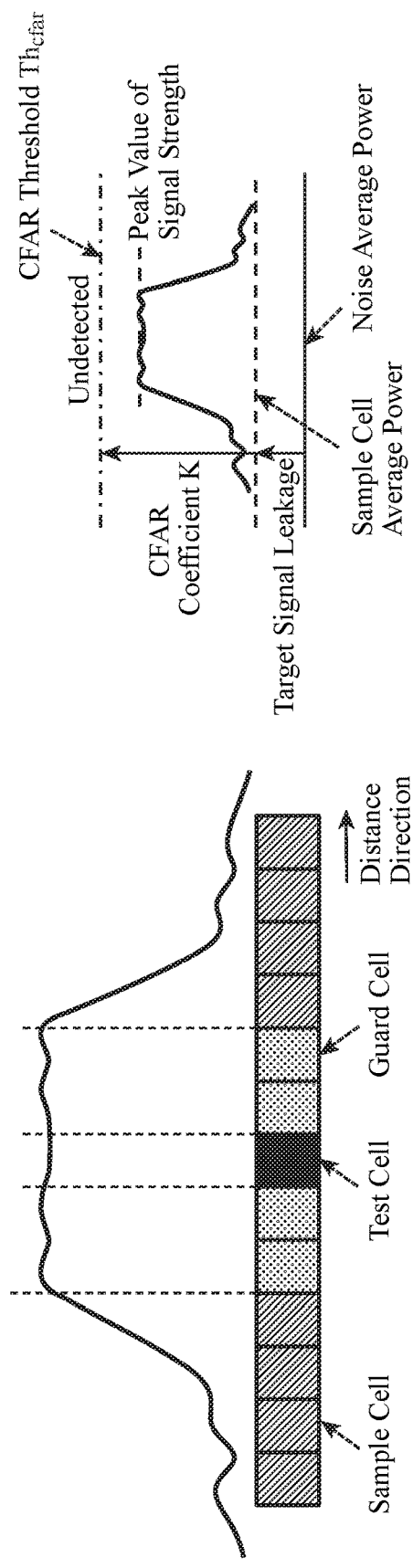
FIG. 9A is an explanatory diagram showing an example in which, even when a spatial extent of a target is large, a range of guard cells in the CFAR signal processing is the same as that in a case where the spatial extent of the target is small.
Figure 9B:
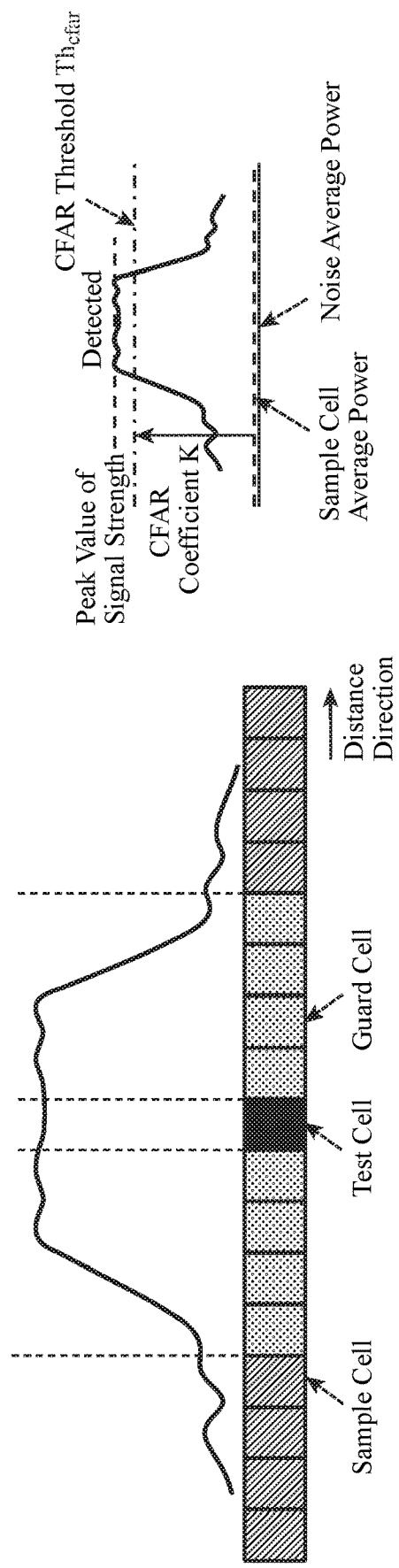
FIG. 9B is an explanatory diagram showing an example in which, when the spatial extent of the target is large, the range of the guard cells in the CFAR signal processing is more expanded than that in a case where the spatial extent of the target is small.

FIGS. 9A and 9B are explanatory diagrams each showing a relationship between a spatial extent of a target and a range of guard cells in the CFAR signal processing.

FIG. 9A is an explanatory diagram showing an example in which, even when the spatial extent of the target is large, the range of guard cells in the CFAR signal processing is the same as that when the spatial extent of the target is small.

FIG. 9B is an explanatory diagram showing an example in which, when the spatial extent of the target is large, the range of guard cells in the CFAR signal processing is more expanded than that when the spatial extent of the target is small.

Although FIG. 9 shows an example in which a plurality of cells in the CFAR signal processing is aligned in a range direction, the plurality of cells in the CFAR signal processing may be aligned in a Doppler frequency direction or an angular direction.

In FIGS. 9A and 9B, signal strength means power.

In a case where, although the spatial extent of the target is large, the range of guard cells in the CFAR signal processing is the same as that when the spatial extent of the target is small, as shown in FIG. 9A, a target signal included in a received video signal leaks into sample cells. As the target signal leaks into the sample cells, the average power of the sample cells is higher than ambient noise average power.

For this reason, a CFAR threshold $Th_{cfar}$ calculated from the average power of the sample cells may be larger than a peak value of the signal strength, as shown in FIG. 9A.

Therefore, the signal strength of a test cell is less than the CFAR threshold $Th_{cfar}$, and the target detection unit 14-*n* cannot detect the target in some cases.

In a case where the spatial extent of the target is large and the range of the guard cells in the CFAR signal processing is more expanded than that when the spatial extent of the target is small, as shown in FIG. 9B, leakage of a target signal included in the received video signal into sample cells is reduced.

For this reason, average power of the sample cells is nearly equal to ambient noise average power, and as shown in FIG. 9B, a CFAR threshold $Th_{cfar}$ calculated from the average power of the sample cells is a value between a peak value of the signal strength and the noise average power.

Therefore, since the signal strength of a test cell is equal to or higher than the CFAR threshold $Th_{cfar}$, the target detection unit 14-*n* can detect the target.

In the first embodiment, in order to enable the N target detection units 14-*n* to detect targets having different spatial extents, the N target detection units 14-*n* are set so that ranges of guard cells in the CFAR signal processing are different from each other.

Hereinafter, the target detection processing by the target detection unit 14-*n* will be specifically described.

A CFAR threshold $Th_{cfar}(n, r)$ corresponding to a distance bin number r (r=1, 2, . . . , R) in the CFAR signal processing performed by the target detection unit 14-*n* (n=1, 2, . . . , N) is expressed as the following equation (4).

$$Th_{cfar}(n, r) = K(n) \times x_{ave}(n, r) \quad (4)$$

(n=1,2, . . . , N)
(r=1,2, . . . , R)

In equation (4), K(n) is a CFAR coefficient in the CFAR signal processing performed by the target detection unit 14-*n*.

$x_{ave}(n, r)$ is average power of sample cells when the distance bin number r in the CFAR signal processing performed by the target detection unit 14-*n* is set to the test cell.

Here, although the target detection unit 14-*n* sets the sample cells to be one-dimensional only in a range bin direction, the sample cells may be one-dimensional only in a Doppler frequency bin direction or an angular bin direction. In addition, the target detection unit 14-*n* may set the sample cells to have multiple dimensions by combining any of the range bin direction, the Doppler frequency bin direction, and the angular bin direction.

The CFAR coefficient K(n) in the CFAR signal processing performed by the target detection unit 14-*n* is expressed as the following equation (5).

$$K(n) = N_{smp}(n)\left(P_{fa}^{\left(\frac{1}{N_{smp}(n)}\right)} - 1\right) \quad (5)$$

$(n = 1, 2, \ldots , N)$

In equation (5), $N_{smp}(n)$ is the number of sample cells in the CFAR signal processing performed by the target detection unit 14-*n*, and $P_{fa}$ is a false alarm probability commonly set to the N target detection units 14-*n*.

The target detection unit 14-*n* sets the power indicated by the received video signal output from the detection unit 13 to all the cells in the CFAR signal processing.

Next, the target detection unit 14-*n* compares power x(r) when the distance bin number r is set to the test cell, of the power of all the cells in the CFAR signal processing, and the CFAR threshold $Th_{cfar}(n, r)$ corresponding to the distance bin number r set in the above equation (4).

The following equation (6) shows comparison processing of the power x(r) of the distance bin number r which is a test cell and the CFAR threshold $Th_{cfar}(n, r)$.

Specifically, equation (6) shows that, when the power x(r) is equal to or greater than the CFAR threshold $Th_{cfar}(n, r)$, a detection value D(n, r) becomes 1, as a detection processing result indicating that a target exists in the distance bin number r. In addition, equation (6) shows that, when the power x(r) is less than the CFAR threshold $Th_{cfar}(n, r)$, the detection value D(n, r) becomes 0, as a detection processing result indicating that no target exists in the distance bin number r.

When the power x(r) is equal to or greater than the CFAR threshold $Th_{cfar}(n, r)$, the target detection unit 14-*n* outputs the detection value D(n, r)=1 to each of the determination processing units 16-1 to 16-M.

When the power x(r) is less than the CFAR threshold $Th_{cfar}(n, r)$, the target detection unit 14-*n* outputs the detection value D(n, r)=0 to each of the determination processing units 16-1 to 16-M.

$$D(n, r) = \begin{cases} 1, & x(r) \geq Th_{cfar}(n, r) \\ 0, & \text{otherwise} \end{cases} \quad (6)$$

$(n = 1, 2, \ldots , N)$
$(r = 1, 2, \ldots , R)$

Figure 10:
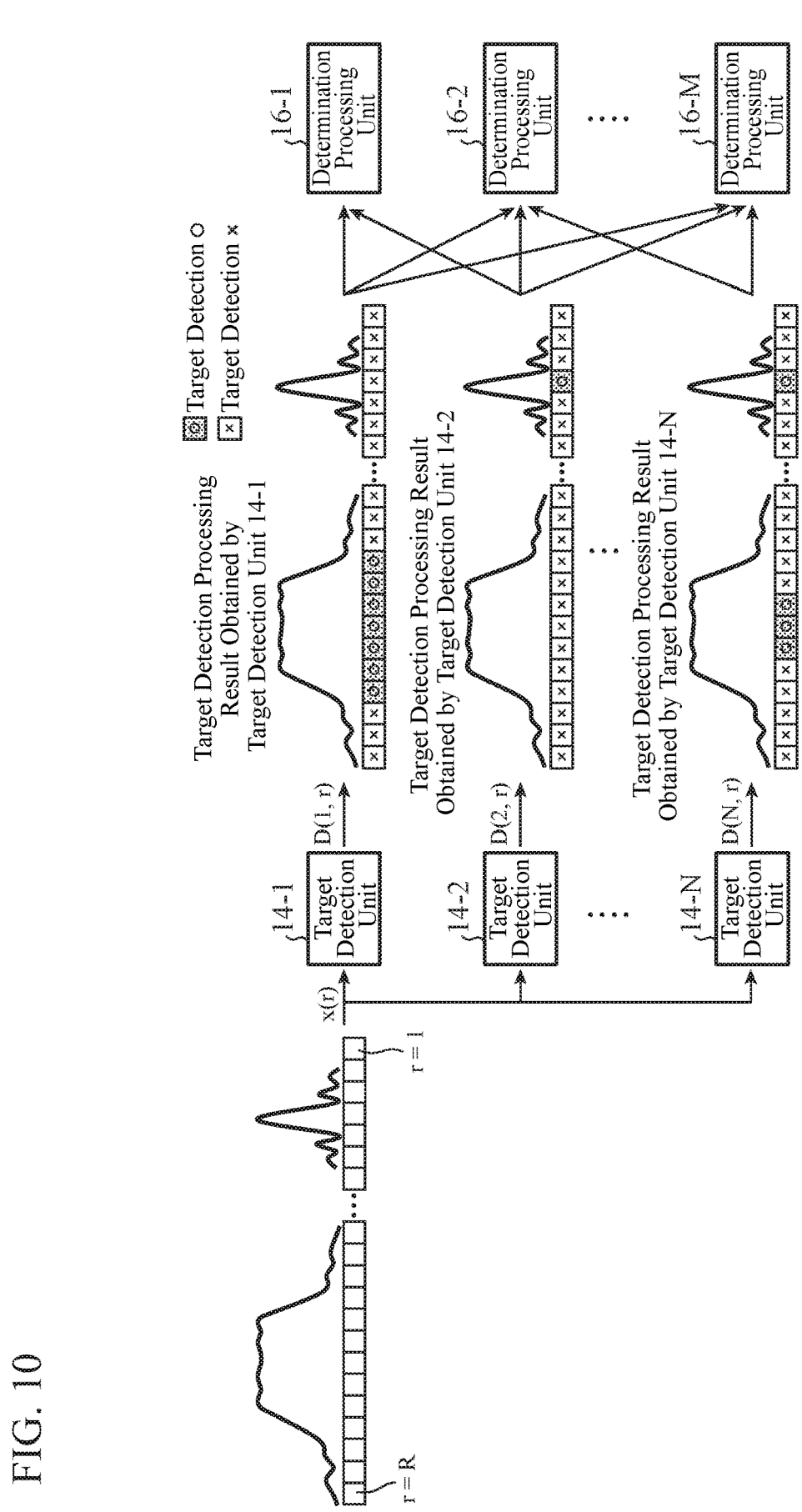
FIG. 10 is an explanatory diagram showing an example of power x(r) indicated by a received video signal output from a detection unit 13 to target detection units 14-$n$ and target detection processing results by the target detection units 14-$n$.

FIG. 10 is an explanatory diagram showing an example of the power x(r) indicated by the received video signal output from the detection unit 13 to the target detection units 14-*n* and target detection processing results obtained by the target detection units 14-*n*.

FIG. 10 shows an example in which the target detection unit 14-1 detects a target having a large spatial extent because a range of guard cells in the CFAR signal processing is expanded.

Further, FIG. 10 shows an example in which the target detection unit 14-2 detects a target having a small spatial extent because a range of guard cells in the CFAR signal processing is narrow.

The parameter storage unit 15 stores parameters for setting target detection performance.

FIG. 11 is an explanatory diagram showing the parameters for setting the target detection performance stored in the parameter storage unit 15.

In the parameter storage unit 15, as the parameters for setting the target detection performance, a target determination threshold $Th_{id}(m)$ for each determination processing unit 16-$m$ (m=1, M) and a weight value $V(m, n)$ for each target detection unit 14-$n$ for each determination processing unit 16-$m$ are stored.

For example, a target determination threshold $Th_{id}(1)$ corresponding to the determination processing unit 16-1 is $Th_\alpha$, and a target determination threshold $Th_{id}(2)$ corresponding to the determination processing unit 16-2 is $Th_\beta$, and a target determination threshold $Th_{id}(M)$ corresponding to the determination processing unit 16-M is $Th_\gamma$.

Further, a weight value $V(1, 1)$ corresponding to the target detection unit 14-1 in the determination processing unit 16-1 is $\alpha_1$, and a weight value $V(2, 3)$ corresponding to the target detection unit 14-3 in the determination processing unit 16-2 is $\beta_3$.

In the first embodiment, it is assumed that the weight value $V(m, n)$ is a positive value, but a part of the weight value may be 0 or a negative value.

In the determination processing unit 16-$m$, the target determination threshold $Th_{id}(m)$ for each determination processing unit 16-$m$ and the weight value $V(m, n)$ for each target detection unit 14-$n$ for each determination processing unit 16-$m$ which are stored by the parameter storage unit 15 are set.

As shown in the following equation (7), the determination processing unit 16-$m$ calculates a multiplication value $V(m, n)D(n, r)$ of the weight value $V(m, n)$ for each target detection unit 14-$n$ and a detection value $D(n, r)$ output from the target detection unit 14-$n$.

Then, the determination processing unit 16-$m$ calculates the total sum $V_{sum}(m, r)$ of the multiplication values $V(m, n)D(n, r)$ of each of the target detection units 14-1 to 14-N, as shown in the following equation (7).

$$V_{sum}(m, r) = \sum_{n=1}^{N} V(m, n)D(n, r) \quad (7)$$

$(m = 1, 2, \ldots, M)$ $(r = 1, 2, \ldots, R)$

When a target is detected by the target detection unit 14-$n$ and the detection value $D(n, r)$ output from the target detection unit 14-$n$ is 1, a multiplication value $V(m, n) \times 1$ is added to the total sum $V_{sum}(m, r)$ by the determination processing unit 16-$m$. Consequently, the value of the total sum $V_{sum}(m, r)$ calculated by the determination processing unit 16-$m$ increases.

On the other hand, when no target is detected by the target detection unit 14-$n$ and the detection value $D(n, r)$ output from the target detection unit 14-$n$ is 0, a multiplication value of 0 is added to the total sum $V_{sum}(m, r)$ by the determination processing unit 16-$m$. Consequently, the value of the total sum $V_{sum}(m, r)$ calculated by the determination processing unit 16-$m$ does not increase.

As shown in the following equation (8), the determination processing unit 16-$m$ determines presence or absence of a target by comparing the total sum $V_{sum}(m, r)$ of the multiplication values of each of the target detection units 14-1 to 14-N and the target determination threshold $Th_{id}(m)$ for each determination processing unit 16-$m$ (step ST5 in FIG. 5).

$$X_{id}(m, r) = \begin{cases} m, & V_{sum}(m, r) \geq Th_{id}(m) \\ 0, & \text{otherwise} \end{cases} \quad (8)$$

$(m = 1, 2, \ldots, M)$ $(r = 1, 2, \ldots, R)$

If the total sum $V_{sum}(m, r)$ is equal to or greater than the target determination threshold $Th_{id}(m)$, the determination processing unit 16-$m$ determines that there is a target (step ST5 in FIG. 5: YES), and outputs a determination result $X_{id}(m, r)=m$ indicating that there is a target to the display 7 (step ST6 in FIG. 5).

If the total sum $V_{sum}(m, r)$ is less than the target determination threshold $Th_{id}(m)$, the determination processing unit 16-$m$ determines that there is no target (step ST5 in FIG. 5: NO), and outputs a determination result $X_{id}(m, r)=0$ indicating that there is no target to the display 7 (step ST7 in FIG. 5).

FIG. 12 is an explanatory diagram showing relationships between the target detection processing results obtained by the target detection units 14-$n$ and the determination results obtained by the determination processing units 16-$m$.

In an example of FIG. 12, of the N target detection units 14-$n$, the target detection units 14-1, 14-3, and 14-N detect targets, and the target detection unit 14-2 does not detect a target.

As a result, in this example, of the M determination processing units 16-$m$, the determination processing unit 16-1 determines that there is a target, and the determination processing units 16-2 and 16-M determine that there is no target.

Here, the target determination threshold $Th_{id}(m)$ for each determination processing unit 16-$m$ and the weight value $V(m, n)$ for each target detection unit 14-$n$ for each determination processing unit 16-$m$ have a relationship shown by the following equation (9).

$$\begin{cases} \sum_{n=1}^{N} V(m, n)D_{tgt}(n, r) \geq Th_{id}(m), & m = m_{tgt} \\ \sum_{n=1}^{N} V(m, n)D_{tgt}(n, r) < Th_{id}(m), & m \neq m_{tgt} \end{cases} \quad (9)$$

$(m = 1, 2, \ldots, M)$ $(r = 1, 2, \ldots, R)$

In equation (9), $m_{tgt}$ is a number indicating a determination processing unit, of the M determination processing units 16-$m$, in which the target determination threshold $Th_{id}(m)$ and the weight value $V(m, n)$ are to be set.

$D_{tgt}(n, r)$ is a detection value $D(n, r)$ indicating a detection processing result of the target detection unit 14-$n$ when determination processing unit 16-$m_{tgt}$ determines that there is a target, and $D_{tgt}(n, r)$ is an assumed value set in advance.

When the target determination threshold $Th_{id}(m)$ and the weight value $V(m, n)$ are set so as to satisfy equation (9), only the determination processing unit 16-$m_{tgt}$, of the M determination processing units 16-$m$, determines that there is a target, and the determination processing units 16-$m$ other than the determination processing unit 16-$m_{tgt}$ determine that there is no target.

Therefore, spatial extents of targets for which presence or absence can be determined by the M determination processing units 16-$m$ can be set to be different from each other.

Upon receiving the determination results $X_{id}(m, r)$ from the M determination processing units 16-$m$, the display 7 displays the M determination results $X_{id}(m, r)$. The determination results $X_{id}(m, r)$ displayed by the display 7 include information indicating a spatial extent of a detected target, as well as information indicating the presence or absence of the target.

Here, an example in which the display 7 displays M determination results $X_{id}(m, r)$ is shown. However, no limitation is intended by this example. By putting together the determination results $X_{id}(m, r)$ output from the M determination processing units 16-$m$ as shown in the following equation (10), the display 7 may display a determination result $X_{disp}(r)$ obtained by putting the M determination results $X_{id}(m, r)$ together.

$$X_{disp}(r) = \sum_{M=1}^{M} X_{id}(m, r) \tag{10}$$

$$(r = 1, 2, \ldots, R)$$

Figure 13:
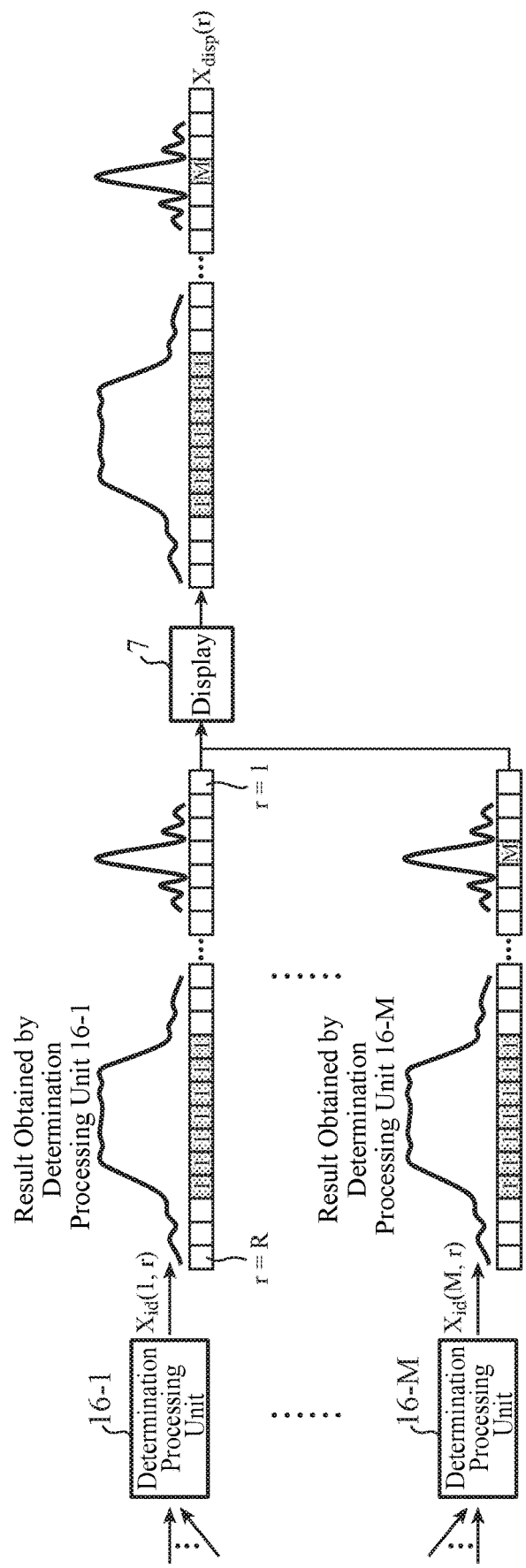
FIG. 13 is an explanatory diagram showing an example of a determination result $X_{disp}(r)$ displayed by a display 7.

FIG. 13 is an explanatory diagram showing an example of the determination result $X_{disp}(r)$ displayed by the display 7.

In the example of FIG. 13, the determination result $X_{disp}(r)$ obtained by putting together the M determination results $X_{id}(m, r)$ is displayed so that the M determination results $X_{id}(m, r)$ are aligned along with a horizontal line.

By displaying the M determination results $X_{id}(m, r)$ or the determination result $X_{disp}(r)$ by the display 7, it is possible to check a detected target and check a spatial extent of the detected target.

In the first embodiment, an example in which the display 7 displays all of the determination results $X_{id}(m, r)$ output from the M determination processing units 16-$m$ is shown. However, no limitation is intended by this example.

For example, if priority is set to the spatial extent of the target, the display 7 may display only a determination result $X_{id}(m, r)$ corresponding to the spatial extent having high priority, of the determination results $X_{id}(m, r)$ output from the M determination processing units 16-$m$.

In the first embodiment described above, the target detection device is provided with the target detection units 14-1 to 14-N that each execute detection processing of targets different in spatial extent from each other on the basis of a detection result of amplitude or power by the detection unit 13, and is configured so that the determination processing unit 16-$m$ determines presence or absence of a target from target detection processing results by the target detection units 14-1 to 14-N. Thus, the target detection device can also detect a target with a spatial extent.

The target detection device of the first embodiment shows an example in which the target detection units 14-1 to 14-N perform, as CFAR signal processing, CFAR signal processing in which ranges of guard cells on range cells are different from each other.

However, no limitation is intended by this example. For example, the target detection units 14-1 to 14-N may perform, as the CFAR signal processing, CFAR signal processing in which ranges of guard cells on Doppler frequency cells are different from each other.

Further, the target detection units 14-1 to 14-N may perform, as the CFAR signal processing, CFAR signal processing in which ranges of guard cells on angle cells are different from each other.

Second Embodiment

Figure 14:
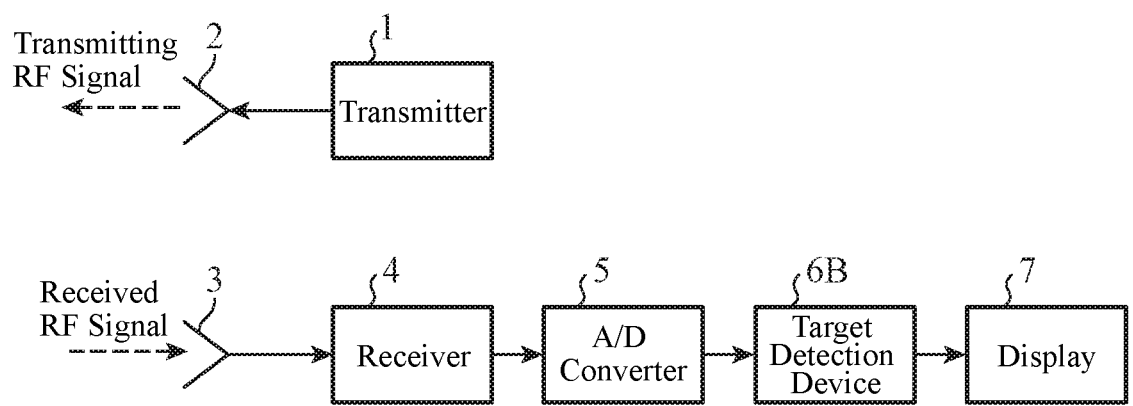
FIG. 14 is a configuration diagram showing a radar apparatus including a target detection device 6B according to a second embodiment of the present invention.

FIG. 14 is a configuration diagram showing a radar apparatus including a target detection device 6B according to a second embodiment of the present invention.

Figure 15:
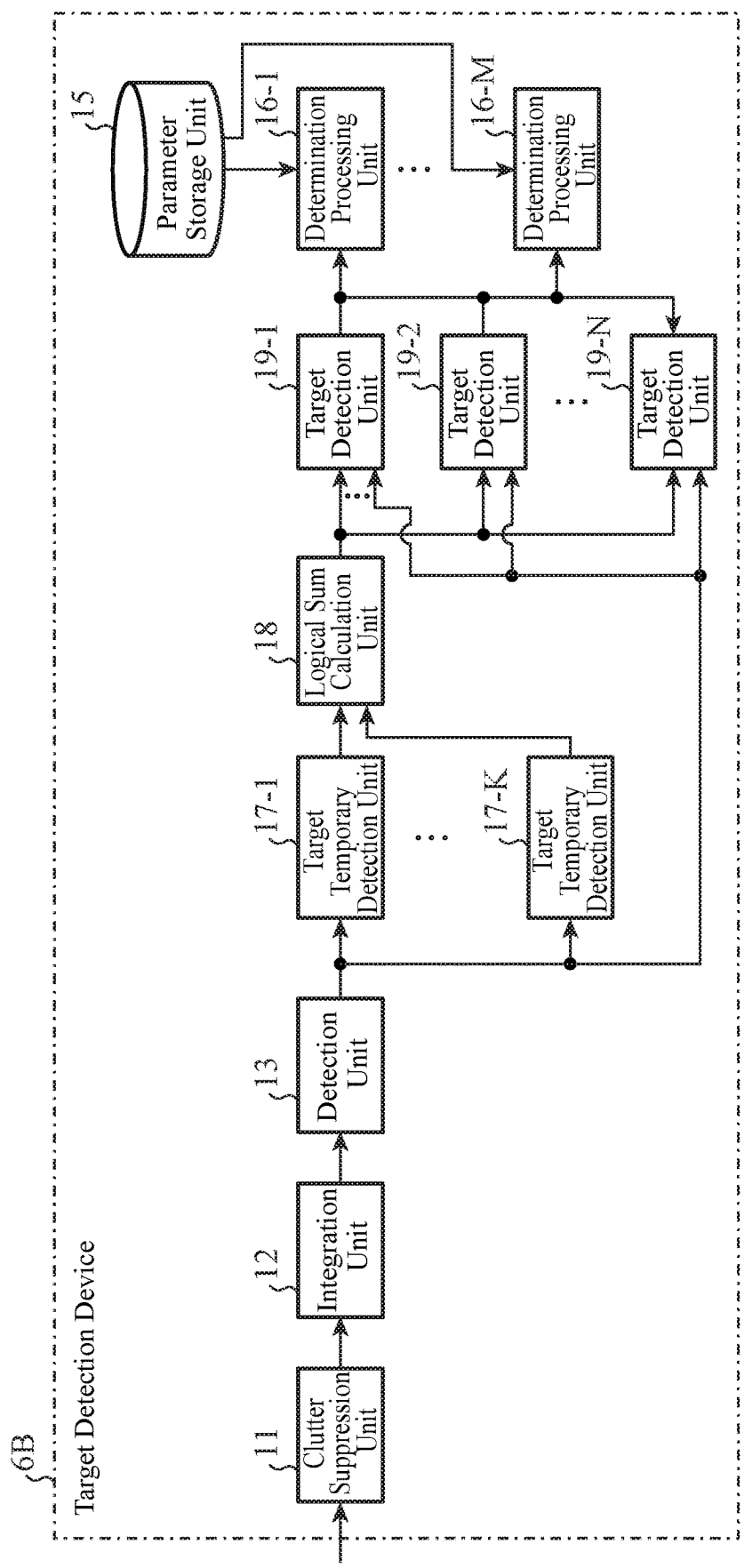
FIG. 15 is a configuration diagram showing the target detection device 6B according to the second embodiment of the present invention.
Figure 16:
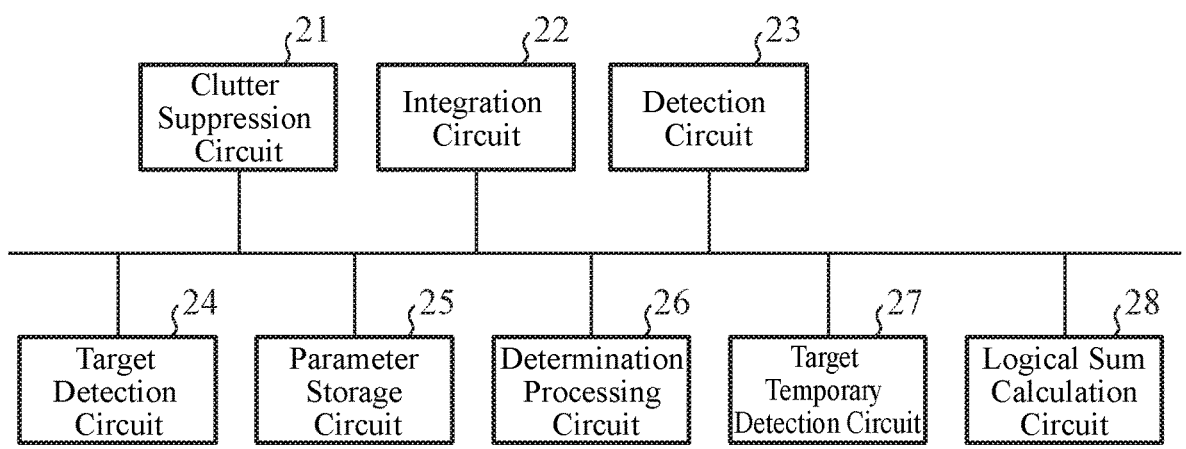
FIG. 16 is a hardware configuration diagram showing the target detection device 6B according to the second embodiment of the present invention.

FIG. 15 is a configuration diagram showing the target detection device 6B according to the second embodiment of the present invention. FIG. 16 is a hardware configuration diagram showing the target detection device 6B according to the second embodiment of the present invention.

In FIGS. 14 to 16, since the same reference numerals as those in FIGS. 1 to 3 indicate the same or corresponding portions, description thereof will be omitted.

The target detection device 6B detects a target on the basis of a digital received signal output from an A/D converter 5.

A display 7 displays a spatial extent and the like of the target detected by the target detection device 6B.

A detection unit 13 of the target detection device 6B detects amplitude or power of an integrated received signal output from an integration unit 12, as in the first embodiment.

However, as a detection result of the amplitude or power, the detection unit 13 outputs a received video signal to each of target temporary detection units 17-1 to 17-K, as well as outputs the received video signal to each of target detection units 19-1 to 19-N.

The target temporary detection unit 17-$k$ ($k=1, 2, \ldots, K$) is implemented by, for example, a target temporary detection circuit 27 shown in FIG. 16.

The target temporary detection unit 17-$k$ temporarily detects a target by performing target temporary detection processing on the basis of the received video signal output from the detection unit 13.

The target temporary detection units 17-1 to 17-K perform, for example, CFAR signal processing as the target temporary detection processing.

A threshold used in the CFAR signal processing performed by each of the target temporary detection units 17-1 to 17-K is different for each target temporary detection unit.

The target temporary detection unit 17-$k$ outputs a target temporary detection processing result to a logical sum calculation unit 18.

The logical sum calculation unit 18 is implemented by, for example, a logical sum calculation circuit 28 shown in FIG. 16.

The logical sum calculation unit 18 carries out processing to calculate a logical sum of target temporary detection processing results by the target temporary detection units 17-1 to 17-K.

When a plurality of target temporary detection units 17-$k$ is mounted on the target detection device 6B, the logical sum calculation unit 18 is mounted on the target detection device 6B, but when only one target temporary detection unit 17-1 is mounted on the target detection device 6B, the logical sum calculation unit 18 is not mounted on the target detection device 6B.

The logical sum calculation unit 18 outputs the calculated logical sum of the temporary detection processing results to each of the target detection units 19-1 to 19-N.

A target detection unit 19-$n$ ($n=1, 2, \ldots, N$) is implemented by, for example, a target detection circuit 24 shown in FIG. 16.

On the basis of the logical sum of the temporary detection processing results output from the logical sum calculation unit 18, the target detection unit 19-$n$ specifies each target temporarily detected by one or more target temporary detection units out of the target temporary detection units 17-1 to 17-K.

The target detection unit 19-$n$ performs processing for detecting targets having different spatial extents from each other of the specified targets on the basis of the received video signal output from the detection unit 13.

In the second embodiment, the total number K of target temporary detection units 17-k is less than the total number N of target detection units 19-n. The relation K<N is satisfied.

In FIG. 15, it is assumed that each of a clutter suppression unit 11, the integration unit 12, the detection unit 13, the target temporary detection unit 17-k, the logical sum calculation unit 18, the target detection unit 19-n, a parameter storage unit 15, and a determination processing unit 16-m which are components of the target detection device 6B is implemented by dedicated hardware as shown in FIG. 16. Namely, it is assumed that the target detection device 6B is implemented by a clutter suppression circuit 21, an integration circuit 22, a detection circuit 23, the target temporary detection circuit 27, the logical sum calculation circuit 28, the target detection circuit 24, a parameter storage circuit 25, and a determination processing circuit 26.

In addition, the clutter suppression circuit 21, the integration circuit 22, the detection circuit 23, the target temporary detection circuit 27, the logical sum calculation circuit 28, the target detection circuit 24, and the determination processing circuit 26 each correspond to, for example, a single circuit, a composite circuit, a programmed processor, a parallel programmed processor, an ASIC, an FPGA, or a combination thereof.

The components of the target detection device 6B are not limited to those implemented by dedicated hardware, and the target detection device 6B may be implemented by software, firmware, or a combination of software and firmware.

When the target detection device 6B is implemented by software or firmware, the parameter storage unit 15 is formed on the memory 31 of the computer shown in FIG. 4. In addition, a program for causing the computer to execute processing procedures of the clutter suppression unit 11, the integration unit 12, the detection unit 13, the target temporary detection unit 17-k, the logical sum calculation unit 18, the target detection unit 19-n, and the determination processing unit 16-m is stored in the memory 31. Then, the processor 32 of the computer executes the program stored in the memory 31.

Figure 17:
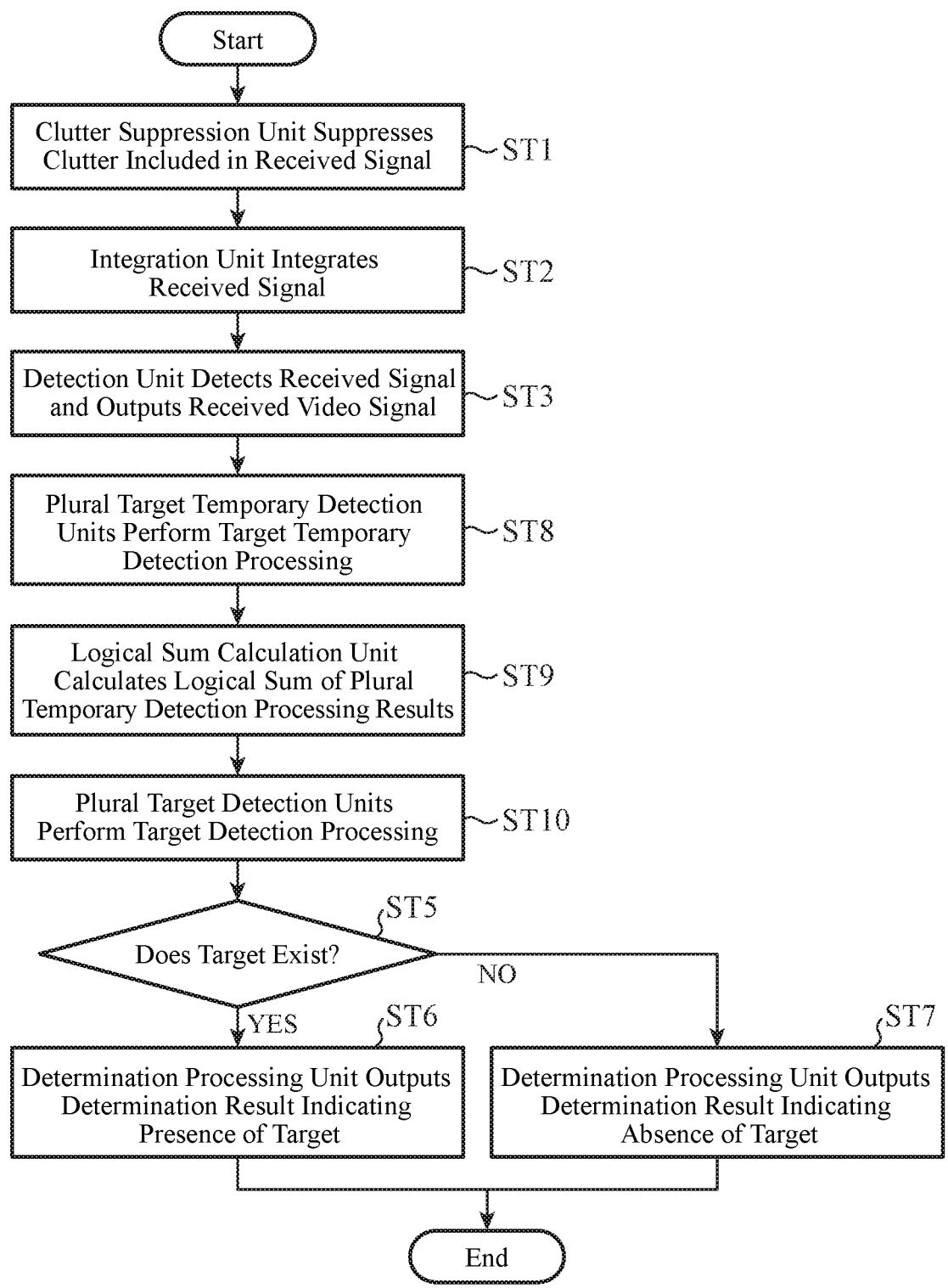

FIG. 17 is a flowchart showing a target detection method which is a processing procedure when the target detection device 6B is implemented by software or firmware.

Further, FIG. 16 shows an example in which each of the components of the target detection device 6B is implemented by dedicated hardware, and FIG. 4 shows an example in which the target detection device 6B is implemented by software or firmware. However, the target detection device 6B may be configured such that some components thereof are implemented by dedicated hardware and remaining components thereof are implemented by software or firmware.

Next, operation of the radar apparatus including the target detection device 6B will be described. In the following, portions different from those in the first embodiment will be described.

The detection unit 13 detects power of the integrated received signal output from the integration unit 12.

As a detection result of the power, the detection unit 13 outputs a received video signal to each of the target temporary detection units 17-1 to 17-K, and outputs the received video signal to each of the target detection units 19-1 to 19-N. (step ST3 in FIG. 17).

In the second embodiment, an example in which the detection unit 13 detects the power of the received signal is described. Other than this example, the detection unit 13 may detect amplitude of the received signal.

Figure 18:
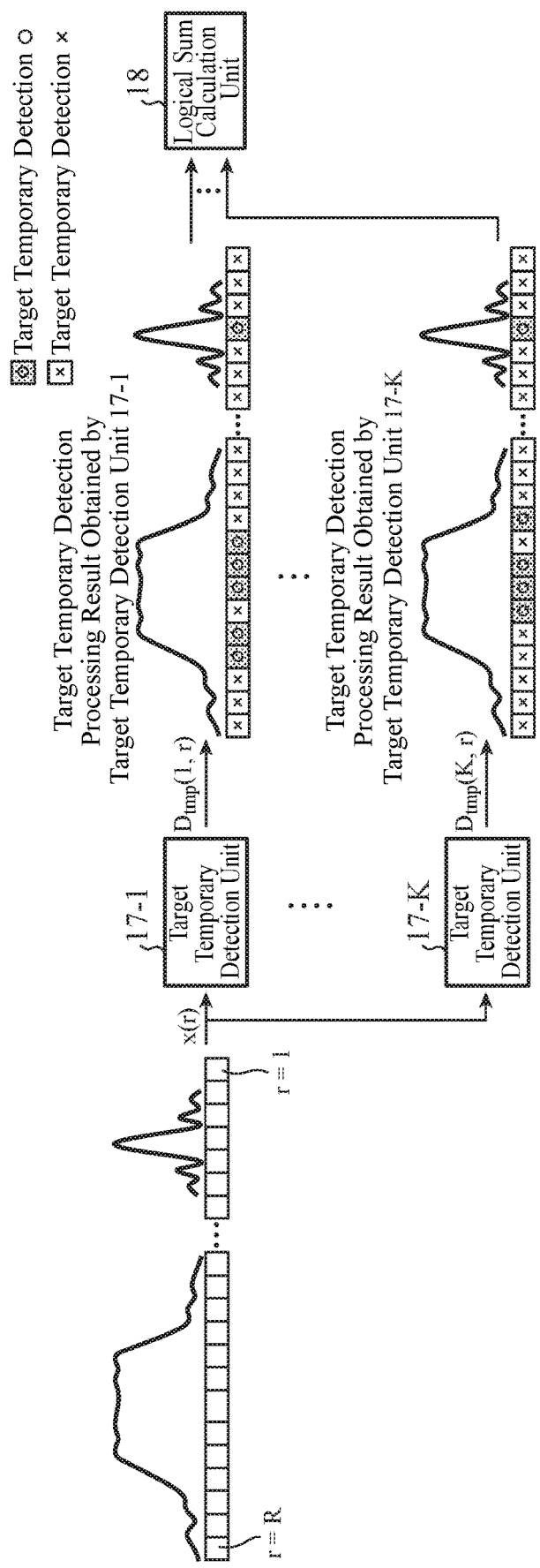
FIG. 18 is an explanatory diagram showing an example of power x(r) indicated by a received video signal output from a detection unit 13 and temporary detection processing results of a target obtained by target temporary detection units 17-1 to 17-K.

FIG. 18 is an explanatory diagram showing an example of power x(r) indicated by the received video signal output from the detection unit 13 and target temporary detection processing results obtained by the target temporary detection units 17-1 to 17-K.

The target temporary detection unit 17-k (k=1, 2, ..., K) receives the received video signal from the detection unit 13 as shown in FIG. 18.

The target temporary detection unit 17-k performs temporary detection of a target by performing target temporary detection processing on the basis of the power x(r) indicated by the received video signal (step ST8 in FIG. 17).

Hereinafter, the target temporary detection processing by the target temporary detection unit 17-k will be specifically described. Here, it is assumed that the target temporary detection unit 17-k performs CFAR signal processing as the target temporary detection processing.

A CFAR threshold $Th_{cfar, tmp}(k, r)$ corresponding to a distance bin number r (r=1, 2, ..., R) in the CFAR signal processing performed by the target temporary detection unit 17-k is expressed as the following equation (11).

$$Th_{cfar,tmp}(k, r) = K_{tmp}(k) \times x_{ave}(k, r) \quad (11)$$

(k=1,2, ..., K)
(r=1,2, ..., R)

In equation (11), $K_{tmp}(k)$ represents a CFAR coefficient in the CFAR signal processing performed by the target temporary detection unit 17-k.

$X_{ave}(k, r)$ is average power of sample cells when the distance bin number r in the CFAR signal processing performed by the target temporary detection unit 17-k is set to a test cell.

Here, although the target temporary detection unit 17-k sets the sample cells to be one-dimensional only in a range bin direction, the sample cells may be set to be one-dimensional only in a Doppler frequency bin direction or an angular bin direction.

In addition, the target temporary detection unit 17-k may set the sample cells to be multiple dimensional by combining the range bin direction, the Doppler frequency bin direction, and the angular bin direction.

The CFAR coefficient $K_{tmp}(k)$ in the CFAR signal processing performed by the target temporary detection unit 17-k is represented by the following equation (12).

$$K_{tmp}(k) = N_{smp}(k)\left(P_{fa}^{\left(\frac{1}{N_{smp}(k)}\right)} - 1\right) \quad (12)$$

(k = 1, 2, ..., K)

In equation (12), $P_{fa}$ is a false alarm probability commonly set to the K target temporary detection units 17-k.

$N_{smp}(k)$ is the number of sample cells in the CFAR signal processing performed by the target temporary detection unit 17-k.

In the second embodiment, $N_{smp}(k)$ is different for each target temporary detection unit 17-k.

Since $N_{smp}(k)$ is different for each target temporary detection unit 17-k, the CFAR threshold $Th_{cfar, tmp}(k, r)$ used when each of the target temporary detection units 17-1 to 17-K performs the CFAR signal processing is different for each target temporary detection unit 17-k.

First, upon receiving the received video signal from the detection unit 13, the target temporary detection unit 17-k sets the power indicated by the received video signal to all cells in the CFAR signal processing.

Next, the target temporary detection unit 17-$k$ compares the power $x(r)$ when the distance bin number $r$ is set to the test cell, of the power of all the cells in the CFAR signal processing, and the CFAR threshold $Th_{cfar,\ tmp}(k, r)$ corresponding to the distance bin number $r$ shown in equation (11).

The following equation (13) shows comparison processing of the power $x(r)$ of the distance bin number $r$ and the CFAR threshold $Th_{cfar,\ tmp}(k, r)$.

Specifically, equation (13) shows that, when the power $x(r)$ is equal to or higher than the CFAR threshold $Th_{cfar,\ tmp}(k, r)$, a detection value $D_{tmp}(k, r)$ becomes 1, as a temporary detection processing result indicating that there is a target in the distance bin number $r$. In addition, equation (13) shows that, when the power $x(r)$ is less than the CFAR threshold $Th_{cfar,\ tmp}(k, r)$, the detection value $D_{tmp}(k, r)$ becomes 0, as a temporary detection processing result indicating that there is no target in the distance bin number $r$.

When the power $x(r)$ is equal to or higher than the CFAR threshold $Th_{cfar,\ tmp}(k, r)$, the target temporary detection unit 17-$k$ outputs the detection value $D_{tmp}(k, r)=1$ to the logical sum calculation unit 18 as the temporary detection processing result.

When the power $x(r)$ is less than the CFAR threshold $Th_{cfar,\ tmp}(k, r)$, the target temporary detection unit 17-$k$ outputs the detection value $D_{tmp}(k, r)=0$ to the logical sum calculation unit 18 as the temporary detection processing result.

In FIG. 8, a symbol "o" indicating that a target is temporarily detected is represented for each cell $(k, r)$ with the detection value $D_{tmp}(k, r)=1$. In addition, a symbol "x" indicating that a target is not temporarily detected is represented for each cell $(k, r)$ with the detection value $D_{tmp}(k, r)=0$.

$$D_{tmp}(k, r) = \begin{cases} 1, & x(r) \geq Th_{cfar,tmp}(k, r) \\ 0, & \text{otherwise} \end{cases} \quad (13)$$

$$(k = 1, 2, \ldots, K)$$

$$(r = 1, 2, \ldots, R)$$

Upon receiving the target temporary detection processing results from the target temporary detection units 17-1 to 17-K, respectively, the logical sum calculation unit 18 calculates a logical sum of the plurality of temporary detection processing results (step ST9 in FIG. 17).

Calculation processing of the logical sum of the plurality of temporary detection processing results is performed for each detection value $D_{tmp}(k, r)$ of the same cell $(k, r)$ in the plurality of temporary detection processing results.

In the plurality of temporary detection processing results, when there is at least one detection value of "1" in the detection values $D_{tmp}(k, r)$ of the same cell $(k, r)$, a logical sum result of the temporary detection processing results in the cell $(k, r)$ is "1".

In the plurality of temporary detection processing results, when all the detection values $D_{tmp}(k, r)$ of the same cell $(k, r)$ are "0", the logical sum result of the temporary detection processing results in the cell $(k, r)$ is "0".

The logical sum calculation unit 18 outputs a temporary detection processing result $D'_{tmp}(k, r)$ to each of the target detection units 19-1 to 19-N as the calculated logical sum of the temporary detection processing results.

Figure 19:
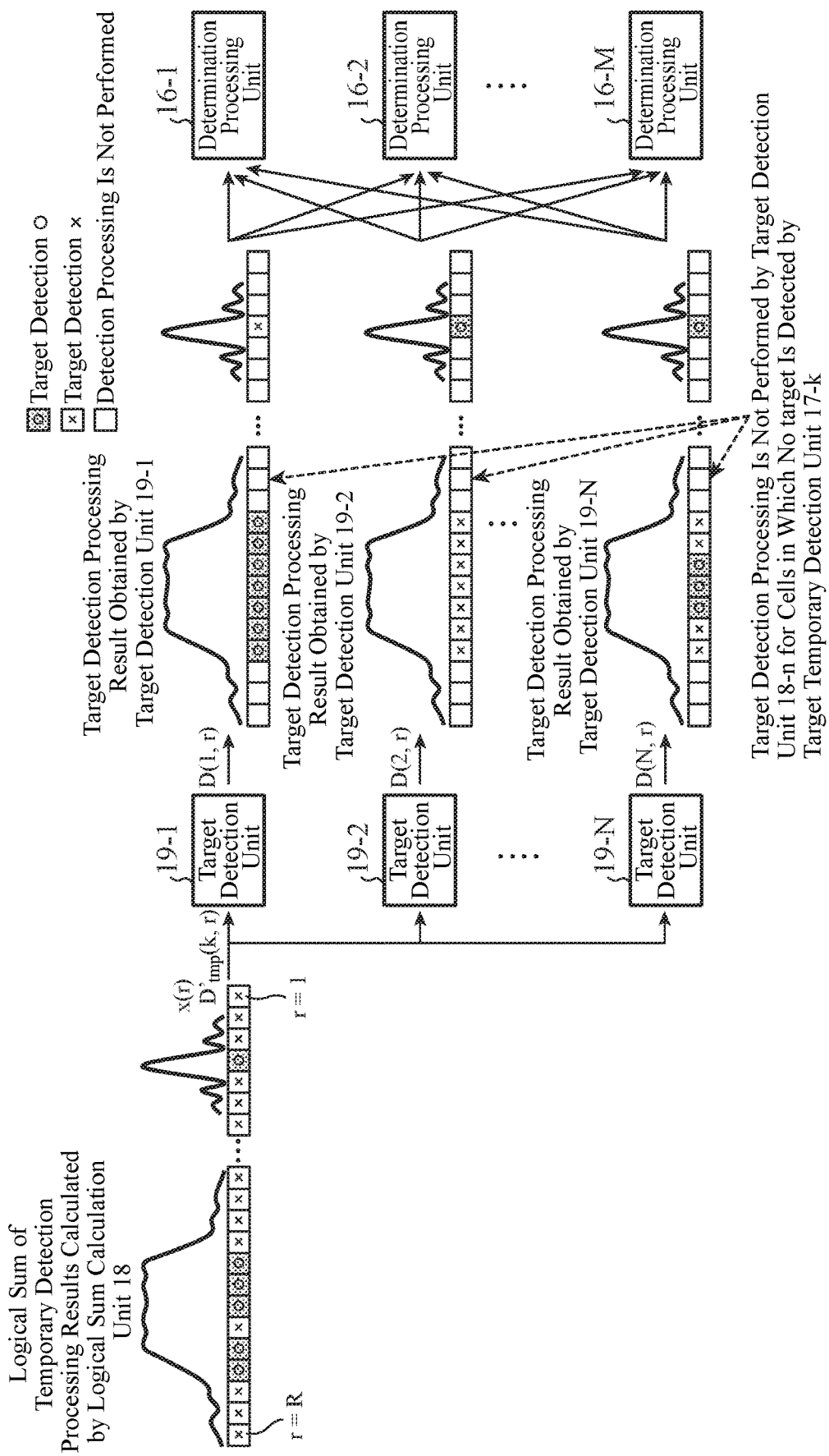
FIG. 19 is an explanatory diagram showing an example of the power x(r) indicated by the received video signal output from the detection unit 13 and a temporary detection processing result $D'_{tmp}(k, r)$ output from a logical sum calculation unit 18, and target detection processing results obtained by target detection units 19-$n$.

FIG. 19 is an explanatory diagram showing an example of the power $x(r)$ indicated by the received video signal output from the detection unit 13, the temporary detection processing result $D'_{tmp}(k, r)$ output from the logical sum calculation unit 18, and target detection processing results obtained by the target detection units 19-$n$.

As shown in FIG. 19, the target detection unit 19-$n$ receives the temporary detection processing result $D'_{tmp}(k, r)$ output from the logical sum calculation unit 18 and the power $x(r)$ indicating the received video signal output from the detection unit 13.

On the basis of the temporary detection processing result $D'_{tmp}(k, r)$ output from the logical sum calculation unit 18, the target detection unit 19-$n$ specifies each target temporarily detected by the one or more target temporary detection units out of the target temporary detection units 17-1 to 17-K.

The temporarily detected target is a target existing in a cell $(k, r)$ in which the detection value $D_{tmp}(k, r)$ indicated by the temporary detection processing result $D'_{tmp}(k, r)$ is "1".

The target detection unit 19-$n$ sets a distance bin number $r$ of the temporarily detected target to the test cell for each temporarily detected target, and sets power of the received video signal output from the detection unit 13 to each of the test cell, a guard cell, and the sample cell.

Since the temporarily detected target is the target existing in the cell $(k, r)$ in which the detection value $D_{tmp}(k, r)$ is "1", the target detection unit 19-$n$ sets the distance bin number $r$ corresponding to the detection value $D_{tmp}(k, r)$ of "1" to the test cell as a target distance bin number.

When the detection value $D_{tmp}(k, r)$ is "0", the target detection unit 19-$n$ does not set the distance bin number $r$ corresponding to the detection value $D_{tmp}(k, r)$ of "0" to the test cell as the target distance bin number.

Next, the target detection unit 19-$n$ compares power $x(r)$ when the distance bin number $r$ is set to the test cell, of the power of all the cells in the CFAR signal processing, and the CFAR threshold $Th_{cfar}(n, r)$ corresponding to the distance bin number $r$ set in the above equation (4) (step ST10 in FIG. 17).

When the power $x(r)$ is equal to or greater than the CFAR threshold $Th_{cfar}(n, r)$, the target detection unit 19-$n$ outputs the detection value $D(n, r)=1$ to each of the determination processing units 16-1 to 16-M as a target detection processing result indicating that the target is detected.

When the power $x(r)$ is less than the CFAR threshold $Th_{cfar}(n, r)$, the target detection unit 19-$n$ outputs the detection value $D(n, r)=0$ to each of the determination processing units 16-1 to 16-M as a target detection processing result indicating that no target is detected.

In FIG. 19, a symbol "o" indicating that a target is detected is represented for a cell $(n, r)$ with the detection value $D(n, r)=1$. In addition, a symbol "x" indicating that no target is detected is represented for a cell $(n, r)$ with the detection value $D(n, r)=0$.

In addition, no mark is represented for a cell $(n, r)$ for which the target detection unit 19-$n$ does not perform the target detection processing.

In the target detection device of the first embodiment, it is necessary to mount the target detection units 14-1 to 14-N whose number is the same as the number of target types to be detected or more than the number of target types to be detected, and the target detection units 14-1 to 14-N carry out the target detection processing in parallel. Therefore, when the number of target types to be detected increases, the total number of target detection units 14-$n$ that execute the target detection processing in parallel increases, so that a calculation processing load of the target detection device increases.

In this processing, the target detection units 14-1 to 14-N perform the target detection processing even for a cell in which a possibility of existence of a target is low.

In the target detection device of the second embodiment, since the target detection units 19-1 to 19-N omit the target detection processing for the cell in which the possibility of existence of the target is low, the calculation processing load is reduced more than that of the target detection device of the first embodiment.

In other words, the target detection units 19-1 to 19-N implement the target detection processing for only a cell in which a target temporarily detected by one or more target temporary detection units, of the target temporary detection units 17-1 to 17-K, exists. Therefore, the calculation processing load of each of the target detection units 19-1 to 19-N is smaller than the calculation processing load of each of the target detection units 14-1 to 14-N in the first embodiment.

For example, when the total number of cells in the CFAR signal processing is about several hundreds, the number of temporarily detected targets is about several. Therefore, the calculation processing load is reduced to the order of one-tenth to one-hundredth.

In the second embodiment, since the target temporary detection units 17-1 to 17-K are mounted on the target detection device, the calculation processing load is higher than that of the target detection device of the first embodiment. However, the total number K of target temporary detection units 17-$k$ is smaller than the total number N of target detection units 19-$n$.

For example, when the total number K of target temporary detection units 17-$k$ is 1, the calculation processing load of the target detection device in the second embodiment increases by the same calculation processing load as a case where one target detection unit 14-$n$ in the first embodiment is added.

However, the calculation processing load of each of the target detection units 19-1 to 19-N is in the order of one-tenth to one-hundredth of the calculation processing load of each of the target detection units 14-1 to 14-N in the first embodiment.

In addition, the number of target types to be detected is about several to several tens.

Therefore, when the total number K of target temporary detection units 17-$k$ is smaller than the total number N of target detection units 19-$n$, although the target temporary detection units 17-1 to 17-K are mounted in the second embodiment, the calculation processing load of the target detection device is reduced more than that of the target detection device in the first embodiment.

In the second embodiment described above, the target detection device is configured to include at least one target temporary detection unit 17-$k$ temporarily detecting targets by performing target temporary detection processing on a basis of the detection result of the amplitude or power by the detection unit 13, and each of the plurality of target detection units 19-1 to 19-N detects targets different in spatial extent from each other from among the targets temporarily detected by the at least one target temporary detection unit 17-$k$ on a basis of the detection result of the amplitude or power by the detection unit 13. Therefore, the target detection device can detect a target even when it has a spatial extent, and the overall calculation processing load is reduced more than that of the target detection device in the first embodiment.

In the target detection device of the second embodiment, the target temporary detection unit 17-$k$ performs temporary detection of a target.

In the target temporary detection unit 17-$k$, in order to prevent failing to detect a target when performing the temporary detection of the target, a false alarm probability in the CFAR signal processing may be decreased to be lower than the false alarm probability in the CFAR signal processing in the target detection unit 19-$n$.

It is to be noted that, in the present invention, any embodiments can be freely combined, any component of each embodiment can be freely modified, and any component of each embodiment can be omitted within the scope of the invention.

INDUSTRIAL APPLICABILITY

The present invention is suitable for a target detection device and a target detection method for detecting a target.

REFERENCE SIGNS LIST

1: Transmitter, 2: Transmitting antenna, 3: Receiving antenna, 4: Receiver, 5: A/D converter, 6: Target detection device, 7: Display, 11: Clutter suppression unit, 12: Integration unit, 13: Detection unit, 14-$n$: Target detection unit, 15: Parameter storage unit, 16-$m$: Determination processing unit, 6B: Target detection device, 17-$k$: Target temporary detection unit, 18: Logical sum calculation unit, 19-$n$: Target detection unit, 21: Clutter suppression circuit, 22: Integration circuit, 23: Detection circuit, 24: Target detection circuit, 25: Parameter storage circuit, 26: Determination processing circuit, 27: Target temporary detection circuit, 28: Logical sum calculation circuit, 31: Memory, 32: Processor.

The invention claimed is:
1. A target detection device comprising:
a memory; and
processing circuitry including:
  a detector configured to detect amplitude or power of a received signal of an electromagnetic wave reflected by a target;
  a plurality of target detectors configured to perform constant false alarm rate processing as a detection processing of targets which are different in spatial extent from each other and in which ranges of guard cells are different from each other among the plurality of target detectors on a basis of a detection result of the amplitude or power by the detector; and
at least one determination processor configured to determine presence or absence of a target from a result of the detection processing of targets performed by the plurality of target detectors by calculating, for each of the plurality of target detectors, a multiplication value of a weight value set for the respective target detector and detection values each indicating the result of the detection processing of a target performed by the respective target detector and by comparing a sum of the multiplication values of the weight values and the detection values for the plurality of target detectors and a target determination threshold,
wherein weight values each corresponding to a spatial extent of a detectable target are set for each of the plurality of target detectors.
2. The target detection device according to claim 1, wherein the target detectors are configured to perform the constant false alarm rate processing in which ranges of guard cells on range cells are different from each other among the plurality of target detectors.

3. The target detection device according to claim 1, wherein the target detectors are configured to perform the constant false alarm rate processing in which ranges of guard cells on Doppler frequency cells are different from each other among the plurality of target detectors.

4. The target detection device according to claim 1, wherein the target detectors are configured to perform the constant false alarm rate processing in which ranges of guard cells on angular cells are different from each other among the plurality of target detectors.

5. The target detection device according to claim 1, wherein
the processing circuitry includes a plurality of determination processors,
the weight values for the target detectors and the target determination threshold are set for each of the determination processors, and
each of the plurality of determination processors determines presence or absence of a target by calculating, for the plurality of target detectors, multiplication values of the weight values set for the plurality of target detectors and a detection values each indicating the result of the detection processing of a target by each of the plurality of target detectors, respectively, and by comparing a sum of the multiplication values of the weight values and the detection values of the plurality of target detectors and the target determination threshold set for said each of the plurality of determination processors.

6. The target detection device according to claim 5, when it is determined that a target is present, each of the plurality of determination processors displays information indicating a spatial extent of a target on a display.

7. The target detection device according to claim 5, wherein the weight values for the target detectors for each of the determination processors and the target determination threshold for each of the determination processors are set such that spatial extents of a target for which presence or absence can be determined by the plurality of determination processors are different from each other.

8. The target detection device according to claim 1, wherein the processing circuitry further includes an integrator configured to integrate the received signal and output the received signal to the detector.

9. The target detection device according to claim 1, wherein the processing circuitry further includes a clutter suppressor configured to suppress clutter included in the received signal and output the received signal whose clutter is suppressed to the detector.

10. The target detection device according to claim 1, wherein the processing circuitry further includes
at least one target temporary detector configured to temporarily detect targets by performing target temporary detection processing on a basis of the detection result of the amplitude or power by the detector,
wherein each of the plurality of target detectors detects targets different in spatial extent from each other from among the targets temporarily detected by the at least one target temporary detector on a basis of the detection result of the amplitude or power by the detector.

11. The target detection device according to claim 10, wherein
the processing circuitry includes a plurality of target temporary detectors, and a logical sum calculator configured to calculate a logical sum of results of the target temporary detection processing respectively obtained by the plurality of target temporary detectors, and
the plurality of target detectors respectively specifies targets, each of the targets being temporarily detected by one or more of target temporary detectors out of the plurality of target temporary detectors on a basis of the logical sum of the results of the target temporary detection processing calculated by the logical sum calculator, and detects targets different in spatial extent from each other from among the targets respectively specified by the plurality of target detectors on the basis of the detection result of the amplitude or power by the detector.

12. The target detection device according to claim 11, wherein
each of the plurality of target temporary detectors is configured to execute constant false alarm rate processing as the target temporary detection processing, and
thresholds respectively used in the constant false alarm rate processing performed by the plurality of target temporary detectors are different from each other.

13. A target detection method for detecting a target having a spatial extent that exceeds the resolution of a radar and a range of a guard cells in CFAR processing, comprising:
detecting, by a detector, amplitude or power of a received signal of an electromagnetic wave reflected by a target;
performing, by each of a plurality of target detectors, constant false alarm rate processing as a detection processing of targets which are different in spatial extent from each other and in which ranges of guard cells are different from each other among the plurality of target detectors on a basis of a detection result of the amplitude or power by the detector;
determining, by at least one determination processor, presence or absence of a target from a result of the detection processing of targets by the plurality of target detectors by calculating, for each of the plurality of target detectors, a multiplication value of the weight value set for a respective target detector and detection values, each indicating a result of the detection processing of a target by the respective target detector, and by comparing a sum of the multiplication values of the weight values and the detection values of the plurality of target detectors and a target determination threshold; and
outputting a determination result indicating the presence or absence of a target and displaying the spatial extent of detected targets based on the determination result,
wherein weight values each corresponding to a spatial extent of a detectable target are set for each of the plurality of target detectors.

* * * * *